(12) United States Patent
Tsukioka

(10) Patent No.: US 8,184,174 B2
(45) Date of Patent: May 22, 2012

(54) IMAGE PROCESSOR AND IMAGE PROCESSING PROGRAM TO CORRECT A SPATIAL FREQUENCY BAND OF AN IMAGE

(75) Inventor: Taketo Tsukioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 994 days.

(21) Appl. No.: 12/032,098

(22) Filed: Feb. 15, 2008

(65) Prior Publication Data

US 2011/0211126 A9  Sep. 1, 2011

Related U.S. Application Data

(63) Continuation of application No. PCT/JP2006/317386, filed on Aug. 28, 2006.

(30) Foreign Application Priority Data

Sep. 1, 2005 (JP) ................................ 2005-253114

(51) Int. Cl.
*G06K 9/03* (2006.01)

(52) U.S. Cl. .................................................. 348/222.1

(58) Field of Classification Search .... 348/222.1–229.1, 348/234, 235
See application file for complete search history.

(56) References Cited

U.S. PATENT DOCUMENTS

| | | | |
|---|---|---|---|
| 5,760,922 A | 6/1998 | Kojima | |
| 7,554,583 B2 * | 6/2009 | Kuno et al. | 348/241 |
| 7,583,303 B2 * | 9/2009 | Mizukura et al. | 348/266 |
| 7,719,575 B2 * | 5/2010 | Makita et al. | 348/222.1 |
| 2002/0006230 A1 | 1/2002 | Enomoto | |
| 2004/0169747 A1 * | 9/2004 | Ono et al. | 348/272 |

FOREIGN PATENT DOCUMENTS

| | | |
|---|---|---|
| JP | 07-193716 | 7/1995 |
| JP | 2001-298619 | 10/2001 |
| JP | 2002-344743 | 11/2002 |
| JP | 2004-112728 | 4/2004 |
| JP | 2005-141770 | 6/2005 |
| WO | WO 2006048962 A1 * | 5/2006 |
| WO | WO 2007026899 A1 * | 3/2007 |

OTHER PUBLICATIONS

PCT/ISA/220, "Notification of Transmittal of the International Search Report and the Written Opinion of the International Searching Authority, or the Declaration" for PCT/JP2006/317386 (in Japanese) (4 pgs.).
PCT/ISA/210, "International Search Report" for PCT/JP2006/317386 (in Japanese) (3 pgs.).
PCT/ISA/237, "Written Opinion of the International Searching Authority" for PCT/JP2006/317386 (in Japanese) (4 pgs.).

* cited by examiner

*Primary Examiner* — David Ometz
*Assistant Examiner* — Dwight C Tejano
(74) *Attorney, Agent, or Firm* — John C. Pokotylo; Straub & Pokotylo

(57) ABSTRACT

The digital camera (100) has an image processor that corrects an input image for a spatial frequency band. The edge enhancement block (106) computes an edge component for band correction. A signal interpolated at color interpolation block (107) to make compensation for a color component missing from each pixel of a single-chip image is then converted at YC transform block (108) into a luminance signal and a color difference signal after tone correction, the luminance and color signals sent out to YC synthesis block (110) and color saturation correction block (109), respectively. Then, the color saturation correction block (109) controls the color saturation of the color difference signal to send it out to YC synthesis block (110). At the same time, the edge component computed at edge enhancement block (106) is sent out to YC synthesis block (110), too.

21 Claims, 19 Drawing Sheets

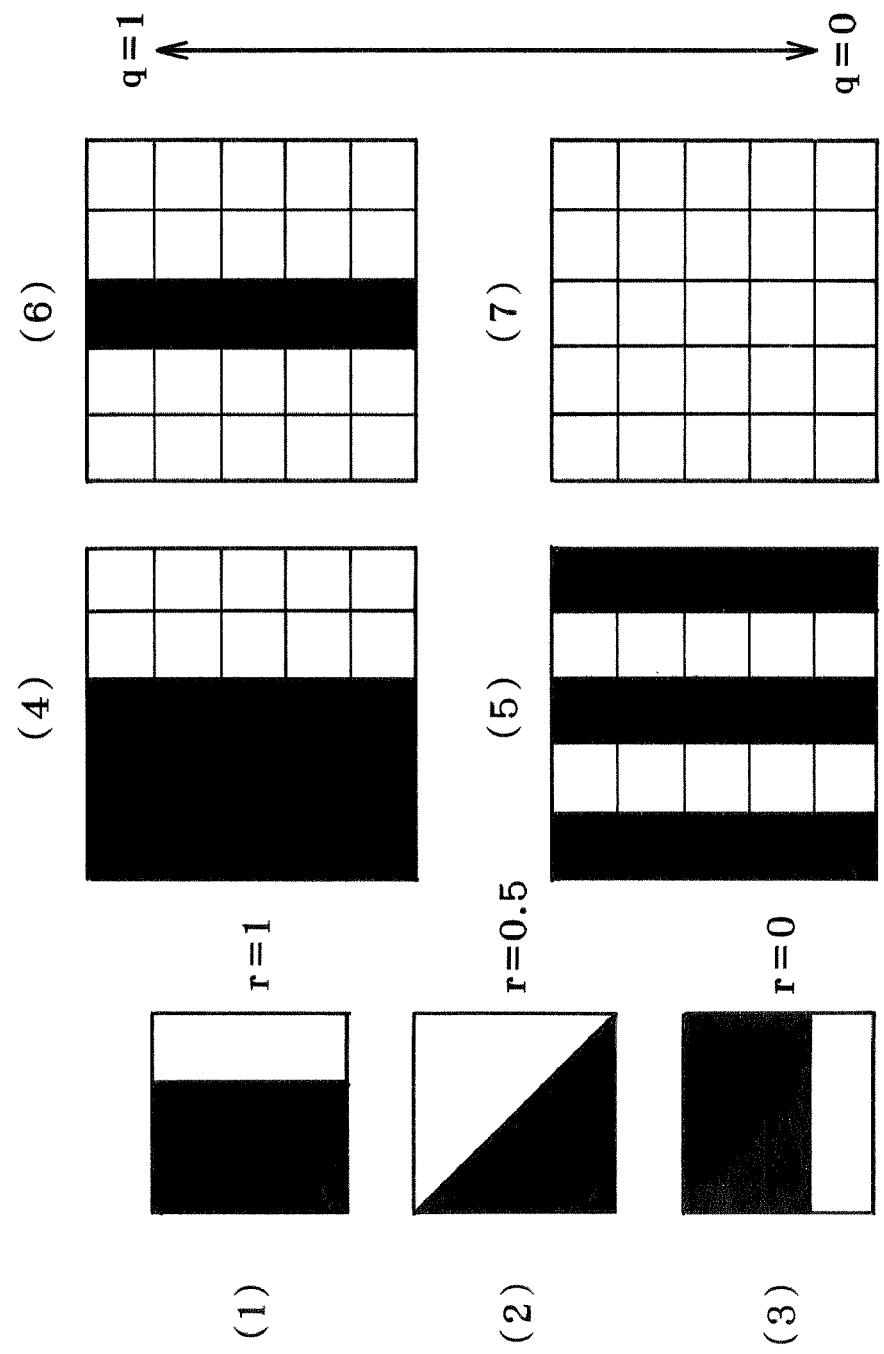

F1

Coefficient

Frequency characteristics

F2

Coefficient

Frequency characteristics

Weight characteristics for a stripe portion

Weight characteristics for an edge portion

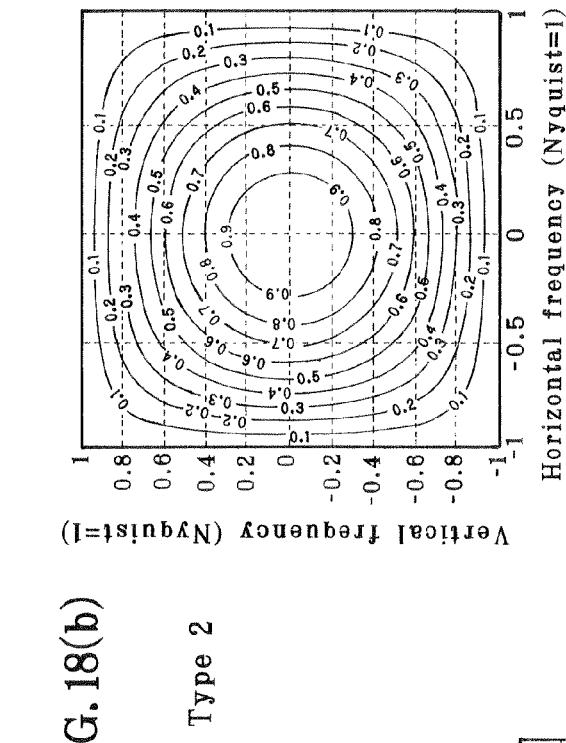
FIG. 18(b) Type 2
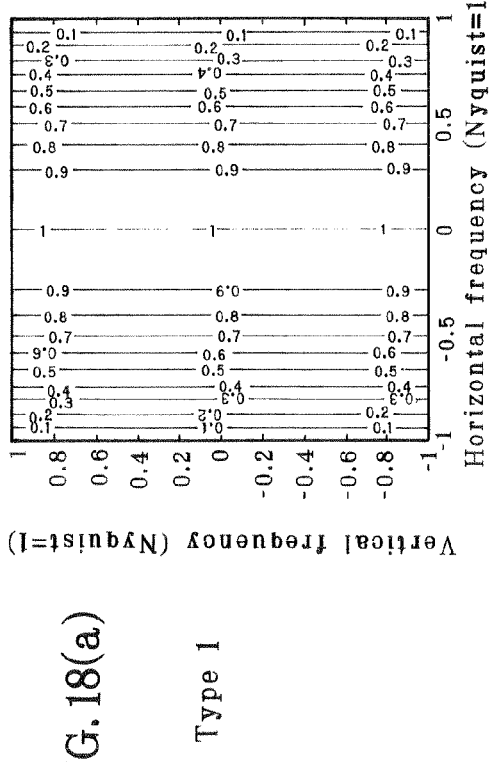
FIG. 18(a) Type 1
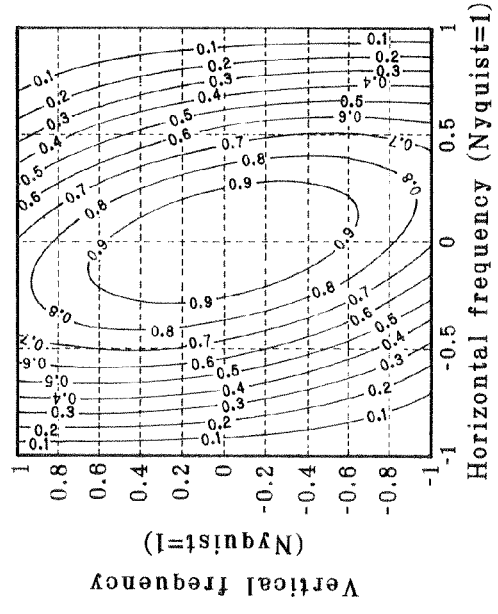
FIG. 18(c) Type 3
FIG. 18(d)
| Type | C1 | C2 | C3 | C4 | C5 | C6 |
|------|-----|-----|-----|-----|-----|-----|
| 1 | a11 | a12 | b11 | b12 | c11 | c12 |
| 2 | a21 | a22 | b21 | b22 | c21 | c22 |
| 3 | a31 | a32 | b31 | b32 | c31 | c32 |

IMAGE PROCESSOR AND IMAGE PROCESSING PROGRAM TO CORRECT A SPATIAL FREQUENCY BAND OF AN IMAGE

CROSS-REFERENCE TO RELATED APPLICATION

This application is a continuation of International Application No. PCT/JP2006/317386, filed on Aug. 28, 2006, titled "IMAGE PROCESSING DEVICE AND IMAGE PROCESSING PROGRAM" and listing Taketo TSUKIOKA, as the inventor, which claims the benefit of Japanese Patent Application No. JP 2005-253114.

TECHNICAL ART

The present invention relates to an image processor and image processing program for applying the optimum edge enhancement to a subject.

BACKGROUND ART

Commonly for image processing systems mounted in digital cameras or the like, frequency-band enhancement processing is applied so as to give the final image sharpness. The simplest approach to the band enhancement processing is to rely on only one band enhancement filter having fixed characteristics. Still, many contrivances have been proposed so far in the art because of difficulty obtaining the best results depending on various subjects.

Further, JP(A)2002-344743 discloses an example of analyzing a halftone structure in an image to control an enhancement filter depending on a screen angle. Furthermore, Japanese Patent No. 2858530 sets forth a method for generating an edge component on the basis of the results of analysis in an edge direction such that there are much less fluctuations along the edge direction, and adding it to the present signal, thereby obtaining an image of better quality even at a decreasing S/N ratio.

However, such prior arts say nothing about contrivances made from the standpoints that when the optimum band enhancement is applied to a subject, it adapts well to various image capturing conditions, and it is implemented in much smaller circuit size.

In view of such problems with the prior art as described above, an object of the invention is to provide an image processor that is capable of applying the optimum band enhancement to a subject in much smaller circuit size, and an image processing program.

DISCLOSURE OF THE INVENTION (1) According to the invention, that object is accomplishable by the provision of an image processor adapted to correct the spatial frequency band of an input image, characterized by comprising a plurality of band correction means having mutually distinct band correction characteristics, a feature quantity computation means adapted to figure out a feature quantity in the neighborhood of each pixel of the input image, and a synthesizing means adapted to synthesize the outputs of said plurality of band correction means on the basis of said feature quantity. According to this arrangement, it is possible to apply the optimum band enhancement to a subject with the state of an optical system, etc. reflected on it, and implement band enhancement processing in much smaller circuit size.

(2) According to the second invention, the invention (1) is further characterized in that said synthesis means is operable to figure out a weight for each of said band correction means on the basis of said feature quantity, and produce the result of weighting by adding said weight to the result of band correction by each of said band correction means. According to this arrangement, it is possible to given the optimum weight to the result of band correction depending on the structure of the subject.

(3) According to the invention (3), the invention (1) is further characterized in that said feature quantity computation means is operable to figure out the direction of an edge in said neighborhood as said given feature quantity. According to this arrangement, it is possible to figure out to which direction of horizontal, vertical and oblique directions the direction of the edge is close.

(4) According to the invention (4), the invention (1) is further characterized in that said feature quantity computation means is operable to figure out the probability of said neighborhood belonging to a given image class as said given feature quantity. According to this arrangement, it is possible to judge the feature of the structure in the neighborhood of the pixel of interest in terms of a numerical value.

(5) According to the invention (5), the invention (3) is further characterized in that said feature quantity computation means is operable to further figure out the reliability of the result of computation of the direction of said edge as said given feature quantity. According to this arrangement, it is possible to improve the reliability of the result of computation of the direction of the edge.

(6) According to the invention (6), the invention (4) is further characterized in that said given image class includes any one of an edge portion, a stripe portion, and a texture portion. According to this arrangement, it is possible to provide specific judgment of the feature of the structure in the neighborhood of the pixel of interest.

(7) According to the invention (7), the invention (1) is further characterized in that said feature quantity computation means is operable to figure out said feature quantity on the basis of the characteristics of the imaging system when said input image is taken. According to this arrangement, it is possible to figure out the feature quantity optimum for the subject.

(8) According to the invention (8), the invention (1) is further characterized in that said synthesis means is operable to implement synthesis on the basis of the characteristics of an imaging system when said input image is taken. According to this arrangement, it is possible to implement the tone correction optimum for the subject.

(9) According to the invention (9), the invention (7) is further characterized in that said characteristics of the imaging system are noise characteristics that provide a relation of the noise quantity vs. pixel value. According to this arrangement, it is possible to make noise correction on the basis of ISO sensitivity.

(10) According to the invention (10), the invention (7) or (8) is further characterized in that said characteristics of the imaging system are information about the type and position of a pixel deficiency. According to this arrangement, it is possible to figure out the feature quantity on the basis of information about the type and position of the image deficiency.

(11) According to the invention (11), the invention (7) or (8) is further characterized in that said characteristics of the imaging system are a sensitivity difference between pixels at which the same type color information is obtained.

(12) According to the invention (12), the invention is further characterized in that said characteristics of the imaging system are the spatial frequency characteristics of the optical system. According to this arrangement, it is possible to figure out the feature quantity on the basis of the spatial frequency characteristics of the optical system.

(13) According to the invention (13), the invention (12) is further characterized in that said characteristics of the imaging system are the spatial frequency characteristics of an optical LPF. According to this arrangement, it is possible to figure out the feature quantity on the basis of the characteristics of the optical LPF.

(14) According to the invention (14), the invention (9) is further characterized in that said feature quantity computation means is operable to lower the precision with which said direction of the edge is figured out as said noise quantity grows large. According to this arrangement it is possible to avoid mistaking a structure that should not be taken as an edge for an edge.

(15) According to the invention (15), the invention (9) is further characterized in that said feature quantity computation means is operable to lower the reliability of said direction of the edge as said noise quantity grows large. According to this arrangement, it is possible to prevent a failure in band correction processing when the noise level is high.

(16) According to the invention (16), the invention (9) is further characterized in that said synthesis means is operable to determine said weight such that the more said noise quantity, the more likely the band correction characteristics of said weighted addition is to grow isotropic. According to this arrangement, it is possible to stave off a failure in band correction processing when the noise level is high.

(17) According to the invention (17), the invention (9) is further characterized in that said synthesis means is operable to determine said weight such that the band correction characteristics of said result of weighed addition become small in a direction orthogonal to a direction along which there are successive pixel deficiencies. According to this arrangement, it is possible to stave off a failure in band correction processing when there is an image deficiency.

(18) According to the invention (18), the invention (1) is further characterized in that there are two band correction means, each of which is a two-dimensional linear filter having a coefficient of point symmetry. According to this arrangement wherein the filter coefficient is of high symmetry, it is possible to reduce the number of computations at the band enhancement block and, hence, diminish the circuit size involved.

(19) According to the invention (19), the invention (1) is further characterized in that one of said filters is such that the band correction characteristics in a particular direction have a negative value. According to this arrangement wherein the coefficient value often takes a value of 0, it is possible to make sure a further reduction in the number of computations at the band enhancement block and, hence, a much diminished circuit size.

(20) According to the invention (20), the invention (1) is further characterized in that said band correction means is operable to apply given tone transform to said input image, and then implement band correction so that said feature quantity computation means can figure out said feature quantity with none of said given tone transform. According to this arrangement, it is possible to figure out said feature quantity with much higher precision.

(21) According to the invention (21), there is an image processing program provided to correct image data for a spatial frequency band, which lets a computer implement steps of reading image data, implementing a plurality of band corrections having mutually distinct band correction characteristics, figuring out a given feature quantity in the neighborhood of each pixel of said image data, and synthesizing the outputs of said plurality of band corrections on the basis of said feature quantity. According to this arrangement, it is possible to run the optimum band enhancement processing for the read image on software.

According to the invention, it is possible to provide an image processor and image processing program capable of applying the optimum band enhancement to a subject according to ISO sensitivity and the state of an optical system, with much smaller circuit size.

BRIEF DESCRIPTION OF THE DRAWINGS

FIG. 3 is illustrative of the operation of the direction judgment block in FIG. 1.

FIG. 4 is illustrative of the operation of the direction judgment block in FIG. 1.

FIG. 18 is illustrative of a correction coefficient table corresponding to the type of optical LPF.

BEST MODE FOR CARRYING OUT THE INVENTION

Figure 1:
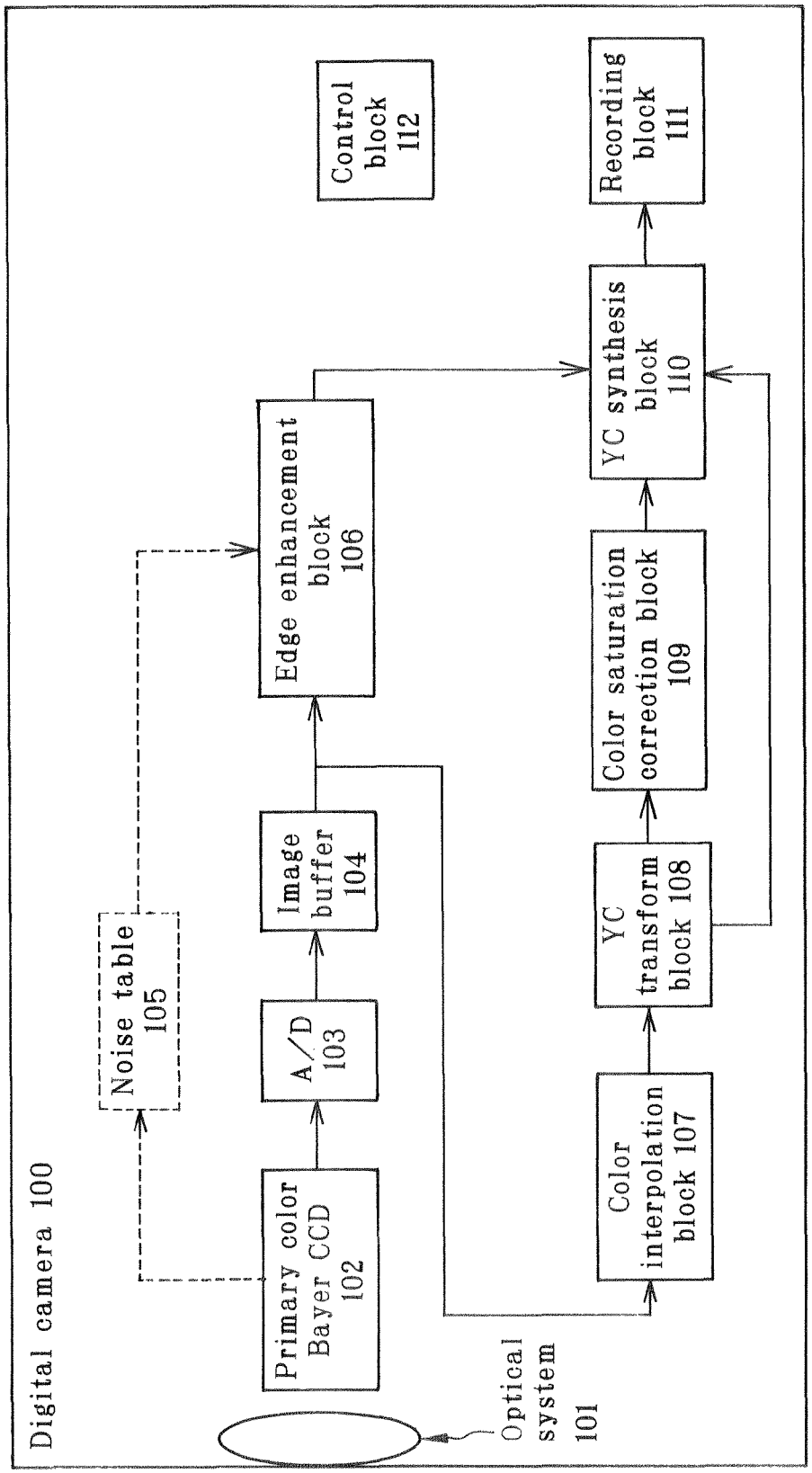
FIG. 1 is illustrative of the architecture of the first embodiment.
Figure 2:
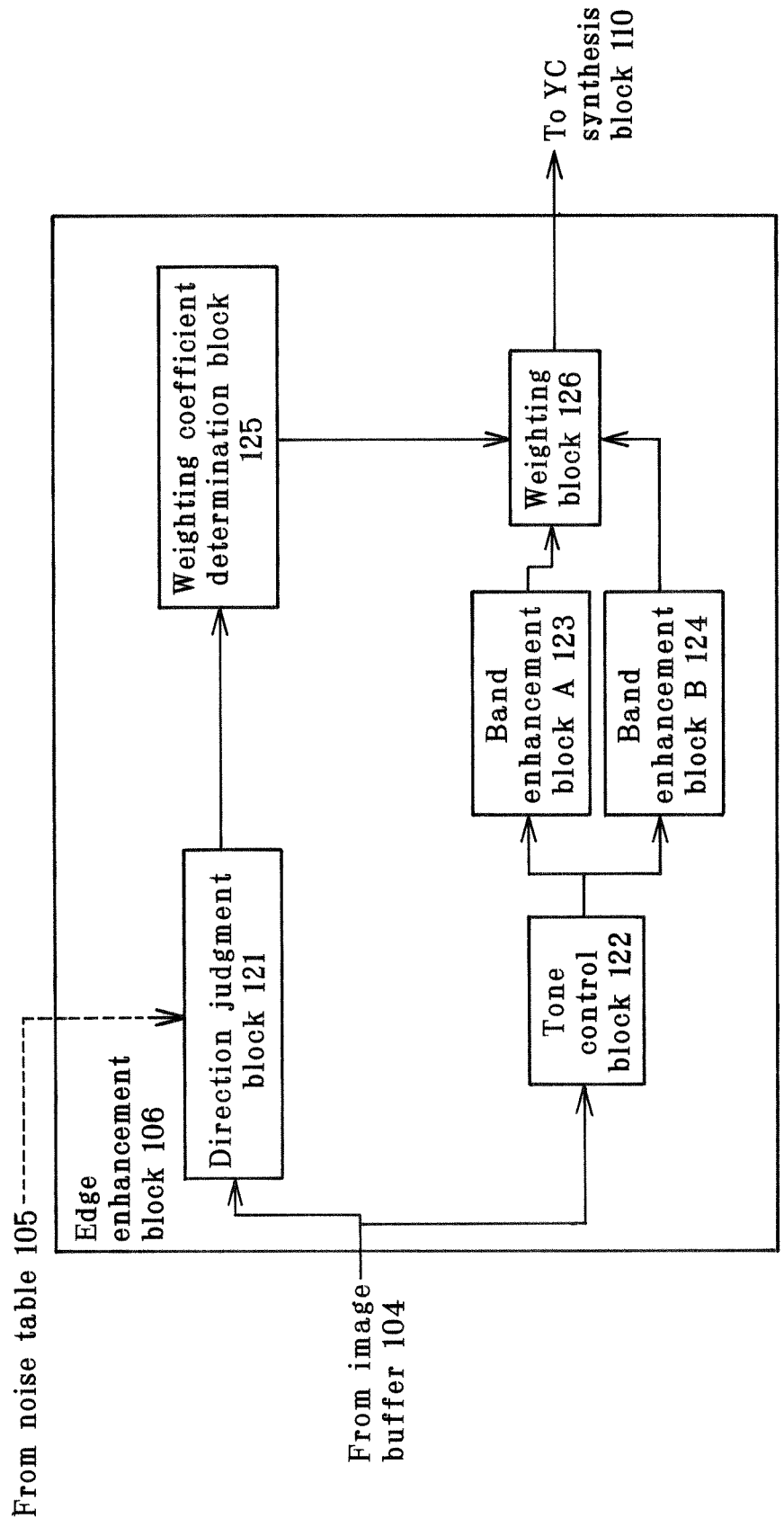
FIG. 2 is illustrative of the setup of the edge enhancement block in FIG. 1.
Figure 5:
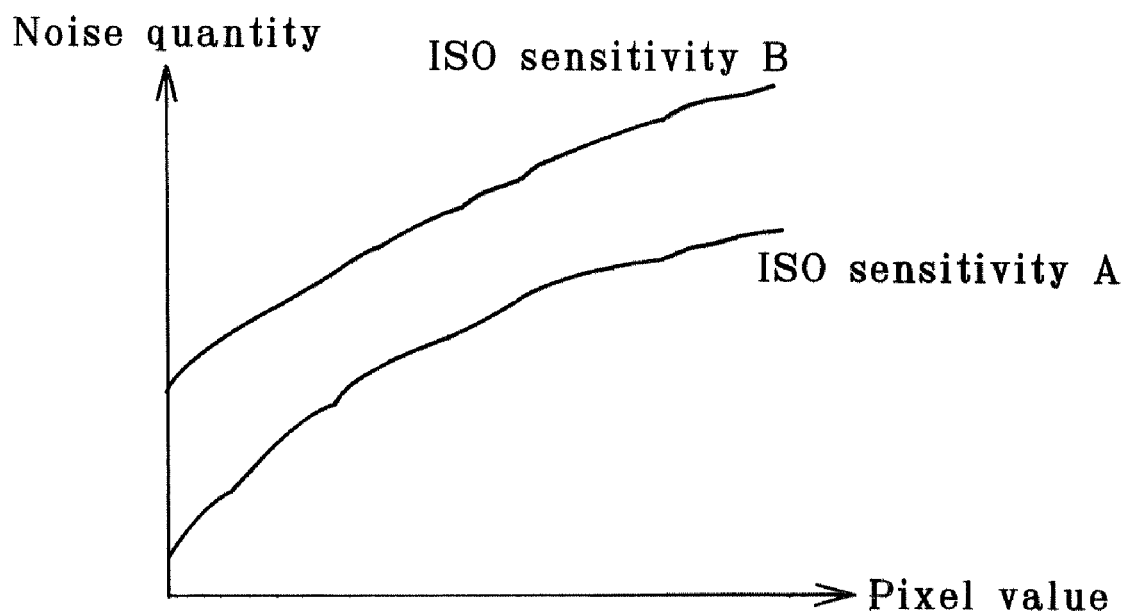
FIG. 5 is illustrative of the noise table in FIG. 1.
Figure 6A:
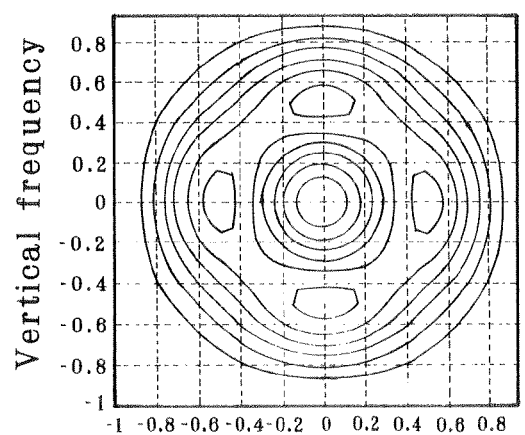
FIG. 6 is illustrative of the enhancement characteristics of the band enhancement block in FIG. 1.
Figure 6B:
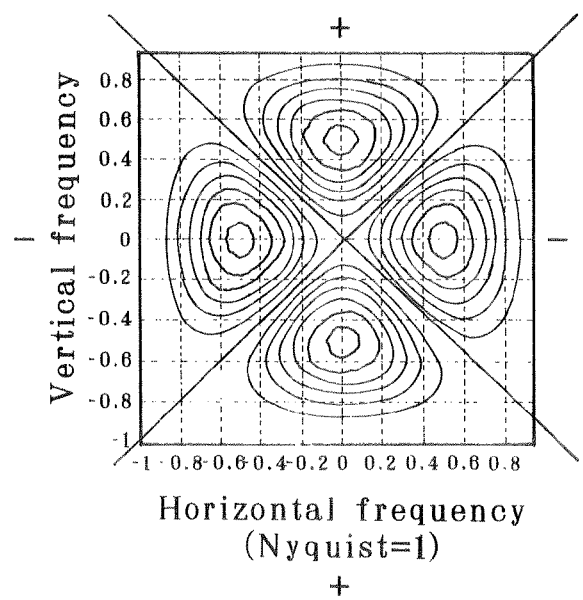
Figure 7B:
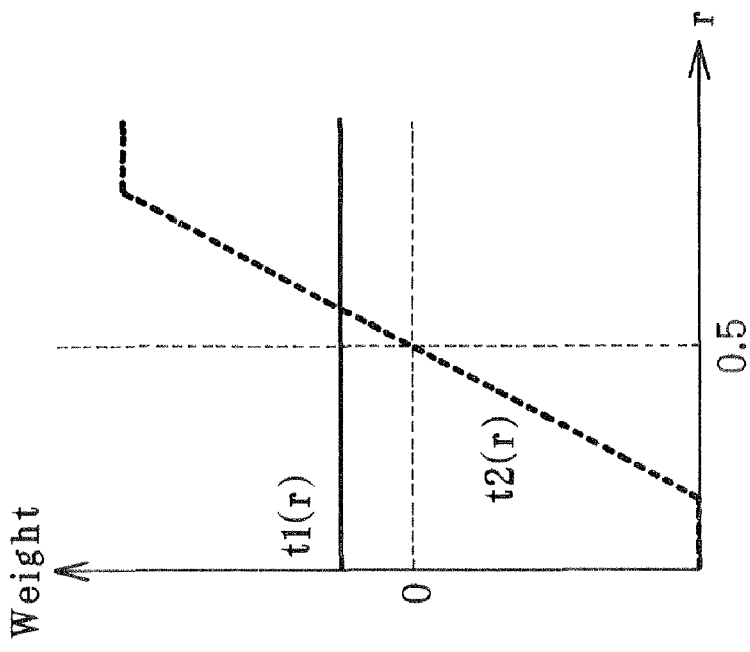
FIG. 7 is illustrative of one exemplary weight characteristics.
Figure 7A:
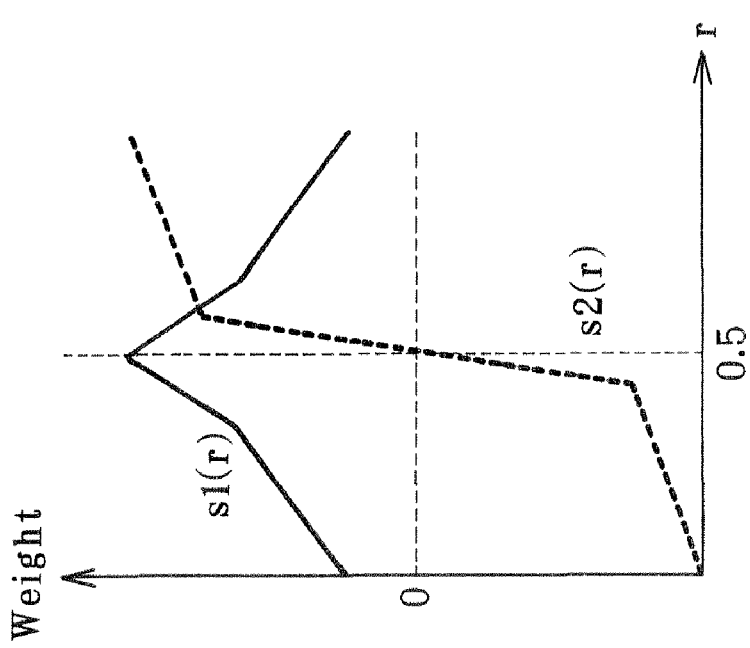
Figure 8:
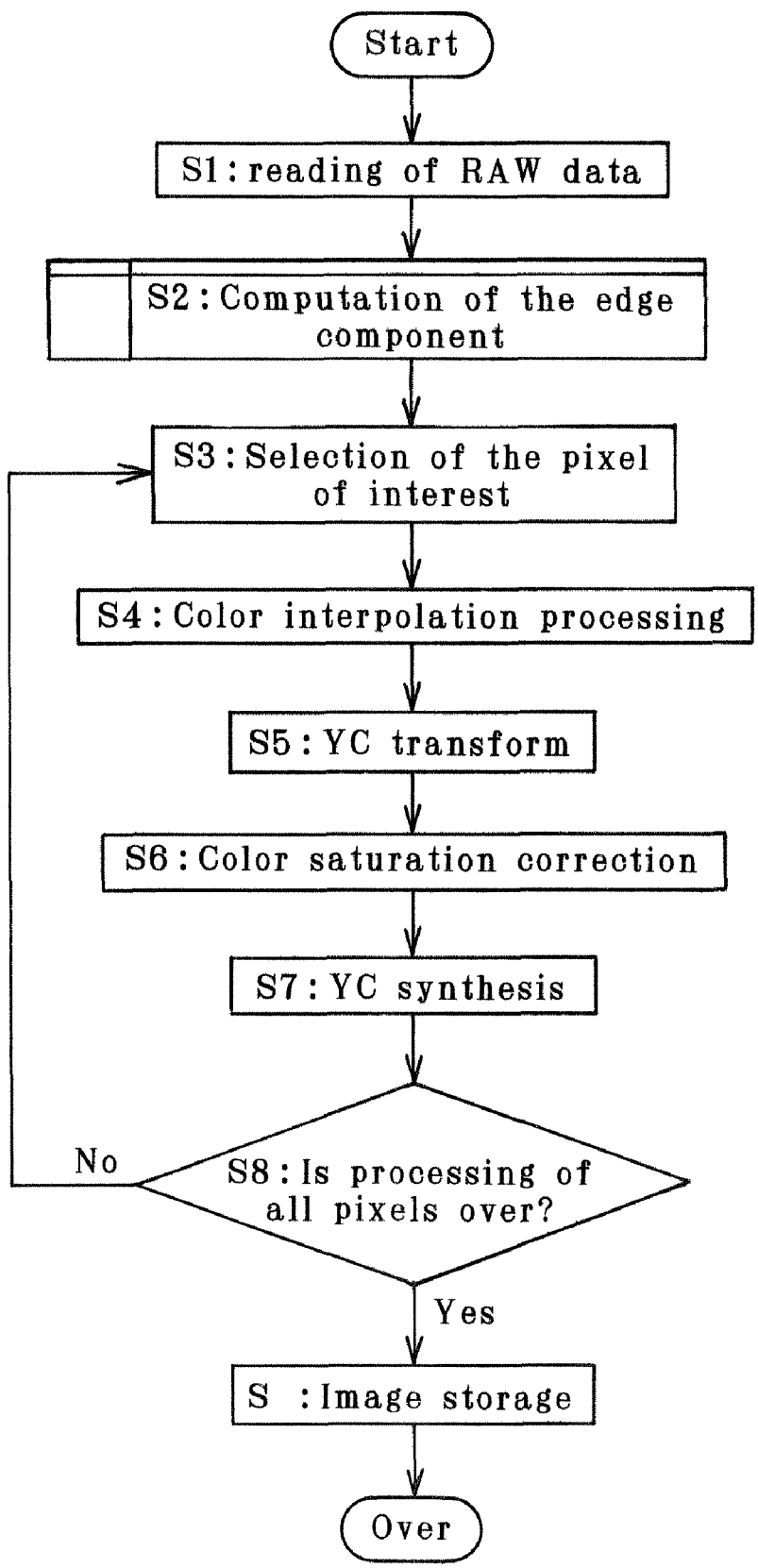
FIG. 8 is flowchart representative of the processing steps in the first embodiment.
Figure 9:
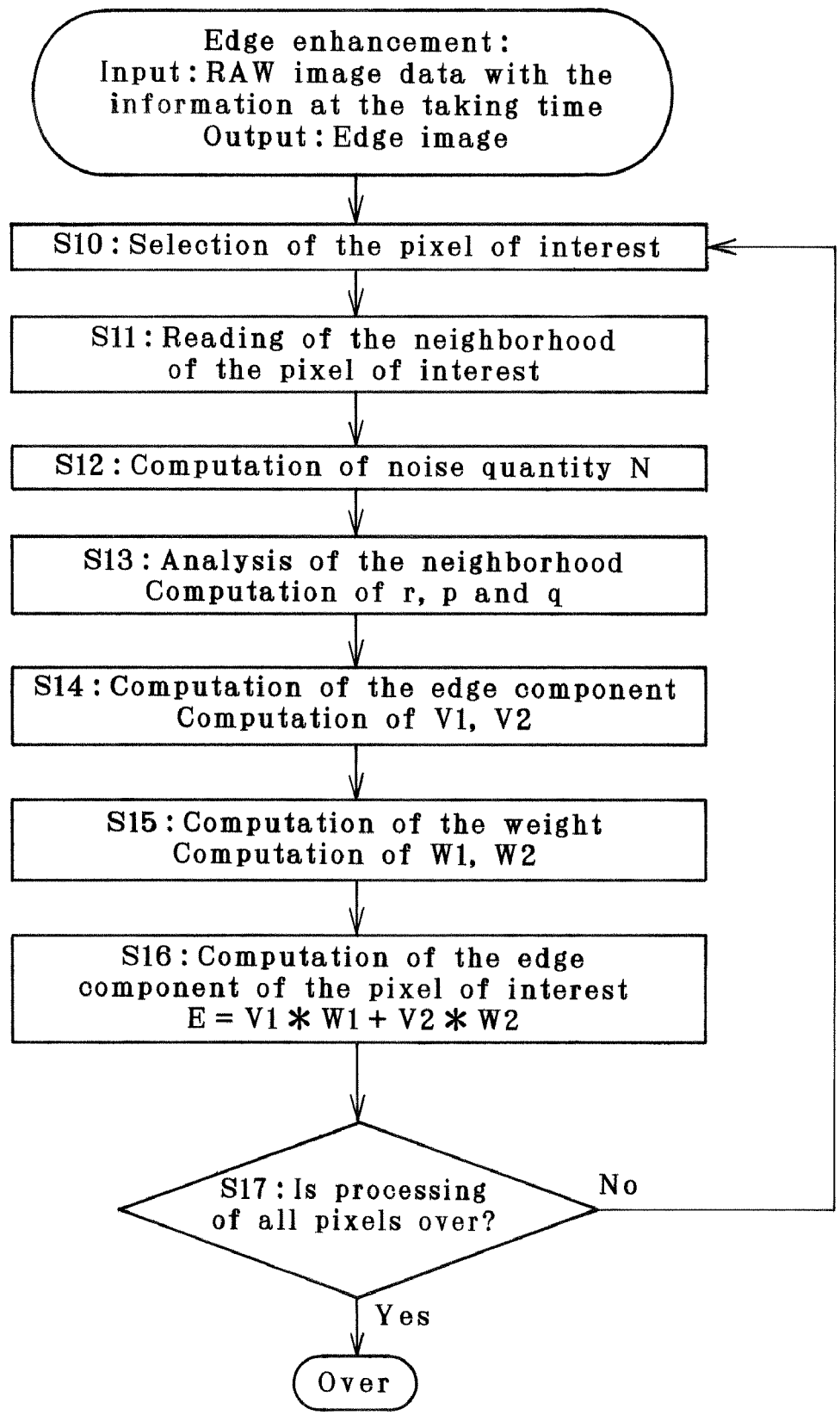
FIG. 9 is a flowchart of how to compute an edge component in FIG. 8.

Some embodiments of the invention are now explained with reference to the accompanying drawings. FIGS. 1 to 9 are illustrative of the first embodiment of the invention. FIG. 1 is illustrative of the architecture of the first embodiment; FIG. 2 is illustrative of the setup of the edge enhancement block in FIG. 1; FIGS. 3 and 4 are illustrative of the operation of the direction judgment block in FIG. 1; FIG. 5 is illustrative of the noise table in FIG. 1; FIG. 6 is illustrative of the enhancement characteristics of the band enhancement block in FIG. 1; FIG. 7 is illustrative of one exemplary weight; FIG. 8 is a flowchart of the RAW development software in the first embodiment; and FIG. 9 is a flowchart of how to figure out the edge component in FIG. 8.

The architecture of the first embodiment according to the invention is shown in FIG. 1. The embodiment here is a digital camera shown generally by 100 that is built up of an optical system 101, a primary color Bayer CCD 102, an A/D converter block 103, an image buffer 104, a noise table 105, an edge enhancement block 106, a color interpolation block 107, a YC transform block 108, a color saturation correction block 109, an YC synthesis block 110, a recording block 111 and a control block 112. The primary color Bayer CCD 102 is connected to the image buffer 107 by way of the A/D converter block 103, and the image buffer 104 is connected to the recording block 111 by way of the color interpolation block 107, YC transform block 108, color saturation correction block 109 and YC synthesis block 110 in order. The image buffer 104 is also connected to the YC synthesis block 110 by way of the edge enhancement block 106. The YC transform block 108 is also connected directly to the YC synthesis block 110. Although not illustrated, the control block 112 is bi-directionally connected to the respective blocks.

FIG. 2 is illustrative of the details of the setup of the edge enhancement block 106 in FIG. 1. The edge enhancement block 106 is built up of a direction judgment block 121, a tone control block 122, a band enhancement block A123, a band enhancement block B124, a weighting coefficient determination block 125 and a weighting block 126. The image buffer 104 is connected to the direction judgment block 121, and to the band enhancement blocks A123 and B124 as well by way of the tone control block 122. The band enhancement blocks A123 and B124 are each connected to the weighting block 126. The direction judgment block 121 is connected to the weighting block 126 by way of the weighting coefficient determination block 125.

Then, the operation of the digital camera 100 is explained. As the shutter (not shown) is pressed down, it causes an optical image formed through the optical system 101 to be photoelectrically converted at the primary color Bayer CCD 102 and recorded as an image signal in the image buffer 104 by way of the A/D converter block 103. For the digital image signal recorded in the image buffer 104, the edge component for band correction is first computed at the edge enhancement block 106, and at the color interpolation block 107, color components missing at each pixel are compensated for by interpolation of the recorded image. The signal interpolated at the color interpolation block 107 is then transformed at the YC transform block 108 into a luminance signal and a color difference signal after tone correction, the luminance signal sent out to the YS synthesis block 110 and the color difference signal to the color saturation correction block 109. Thereafter, the color saturation of the color difference signal is controlled at the color saturation correction block 109, and sent out to the YC synthesis block 110. At the same time, the edge component computed at the edge enhancement block 106, too, is sent out to the YC synthesis block 110.

As the YC synthesis block 110 receives the color difference signal with its color saturation controlled, the luminance signal and the edge component, it first adds the edge component to the luminance signal to create a luminance signal with its band corrected. And there is known processing implemented to combine that luminance signal with the color signal for conversion into an RGB signal, and the result is sent out to the recording block 111. At the recording block 111, the entered signal is compressed and recorded in a recording medium. Thus, the operation of the digital camera 100 is over.

Figures 3A, 3B:
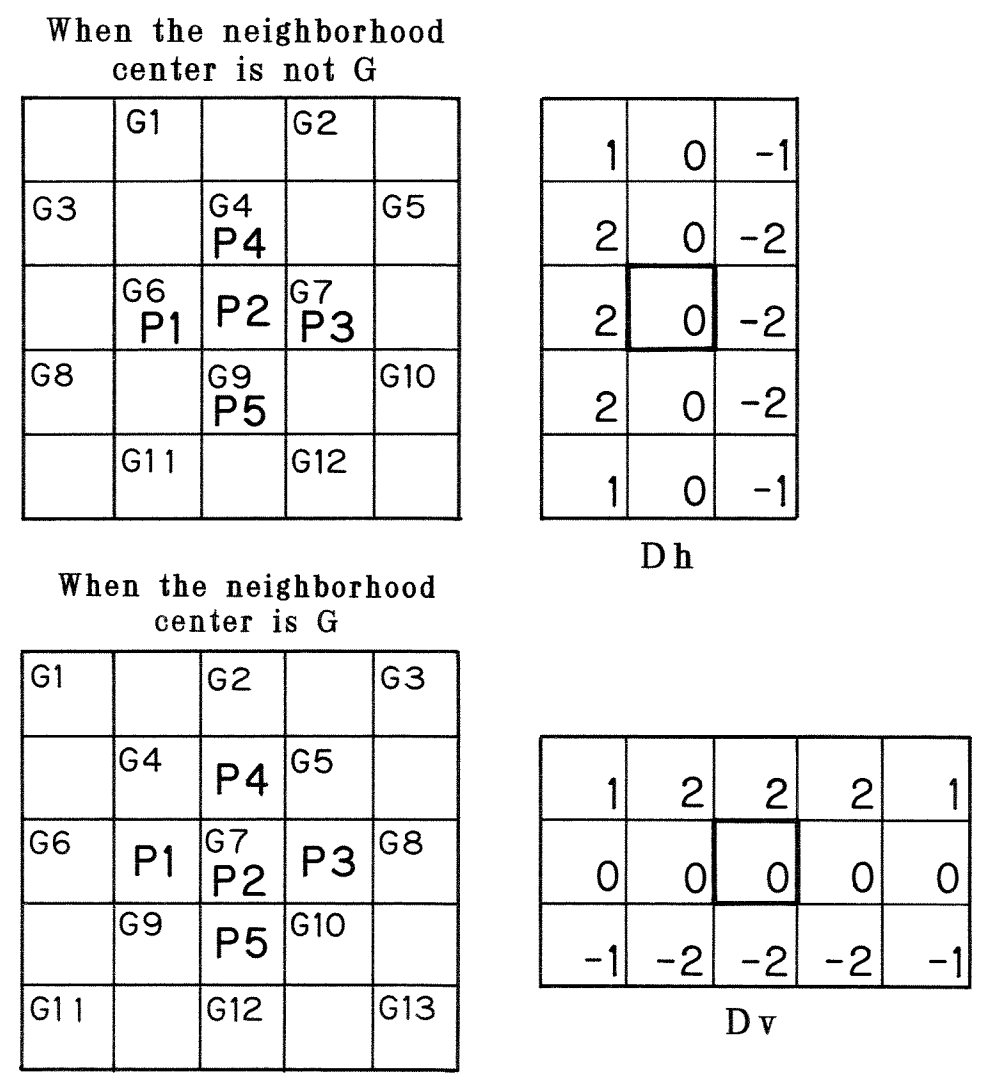

The operation of the edge enhancement block 106—the feature of the first embodiment according to the invention—is now explained at great length. At the edge enhancement block 106, digital image signals within the image buffer 104 are processed; that is, the direction and structure of an edge near each pixel are first estimated at the direction judgment block 121. FIG. 3 is illustrative of an exemplary pixel arrangement and filter used for the estimation at the direction judgment block of the edge direction and structure in the neighborhood of each pixel. FIG. 3(a) is illustrative of a pixel arrangement when the neighborhood center of the pixel of interest is not G, and FIG. 3(b) is illustrative of a pixel arrangement when the neighborhood center of the pixel of interest is G. On FIG. 3(a), a filter Dh for measuring the magnitude of a horizontal fluctuation is also shown. On FIG. 3(b), a filter Dv for measuring the magnitude of a vertical fluctuation is also shown.

First, the direction judgment block 121 reads only the G component out of the 5×5 neighborhood of each pixel, as shown in FIG. 3(a) (the position of each blank takes a value of 0). And two such filters Dh and Dv are applied to the G component to examine the neighbors' edge structures. In this case, the filter Dh is primarily applied to the position of P1, P2, and P3 shown in FIG. 3(a), while the filter Dv is primarily applied to the position of P4, P2, and P5 shown in FIG. 3(a). As a result, three measurements dh1, dh2, dh3 and dv1, dv2, dv3 are obtained for each direction. For instance, when the G pixel is in the neighborhood center, a set of specific computation formulae is given by (1).

$$dh1=|2*(G3-G4)+2*(G8-G9)| \text{ (Result at } P1\text{)}$$

$$dh2=|G1-G2+2*(G7-G7)+G11-G12| \text{ (Result at } P2\text{)}$$

$$dh3=|2*(G4-G6)+2*(G9-G10)| \text{ (Result at } P3\text{)}$$

$$dv1=|2*(G1-G6)+2*(G2-G7)| \text{ (Result at } P4\text{)}$$

$$dv2=|G3-G8+2*(G4-G9)+G5-G10| \text{ (Result at } P2\text{)}$$

$$dv3=|2*(G6-G11)+2*(G7-G12)| \text{ (Result at } P5\text{)} \quad (1)$$

where |x| stands for the absolute value of x.

Further, at the direction judgment block 121, the average value Ag of the G components in the neighborhood of the pixel of interest is at the same time found to estimate the average quantity of noise in the neighborhood on the basis of the noise characteristic information loaded in the noise table 105. In the noise table 105, the characteristics of noise occurring at the primary color Bayer CCD 102 are stored in dependence on each ISO sensitivity at the taking time, as shown in FIG. 5. Such characteristics, indicative of the relation of noise quantity vs. pixel value, are obtained by measurement beforehand. At the direction judgment block 121, a table Nc indicative of the relation of pixel value vs. noise quantity at the present ISO sensitivity is read out of these characteristics to find a noise quantity N in the neighborhood from N=Nc (Ag) with Ag as the index. And the following set of formulae (2) is used to compute from the measurements dh1 to dv3 and N and index r indicative of the direction of the structure in the neighborhood of the pixel of interest, an index q indicative of the type of the structure of the edge or the like, and reliability p about the estimated direction of the structure of the edge or the like.

$$dh=(dh1+dh2+dh3)/3$$

$$dv=(dv1+dv2+dv3)/3$$

$$qh=\{\min(dh1,dh2,dh3)+N\}/\{\max(dh1,dh2,dh3)+N\}$$

$$qv=\{\min(dv1,dv2,dv3)+N\}/\{\max(dv1,dv2,dv3)+N\}$$

$$r=(dv-dh)/\{2*(dh+dv)+\alpha*N\}+0.5$$

$$p=\text{clip}\{\max(dh,dv)/(N*\beta),1\}$$

$$\text{If } q=dh>dv,\ qh,\ \text{and if not},\ qv. \quad (2)$$

where min(x, y, z) are the minimum values of x, y and z; max(x, y, z) are the maximum values of x, y and z; and clip (x, a) is the function for limiting x to less than a.

In formulae (2), $\alpha$ and $\beta$ are each a given constant, and dh and dv are indicative of the average quantities of horizontal and vertical pixel value fluctuations in the neighborhood. FIG. 4($a$) is illustrative of the aforesaid index r, and FIG. 4($b$) is illustrative of the aforesaid index q. As the structure of the edge or the like in the neighborhood gets close to horizontal as shown in FIG. 4($a$)-(3), the index r takes the value of 0; as it gets close to vertical as shown in FIG. 4($a$)-(1), the index r takes the value of 1; and as it gets close to an oblique 45° as shown in FIG. 4($a$)-(2), the index r takes the value of 0.5.

If the structure within the neighborhood of the pixel interest gets close to an edge or line as shown in FIGS. 4($b$)-(5) and 4($b$)-(7), the index q takes the value of 0, and if it gets close to a flat portion or stripe as shown in FIGS. 4($b$)-(4) and 4($b$)-(6), the index q takes the value of 1. Here, when the noise quantity N is large and the contrast of the structure in the neighborhood is weak, the index r is going to approach 0, the index q is going to approach 1, and the index p is going to approach 0. Thus, the index q has a function of figuring out the probability of the neighborhood of the pixel of interest belonging to a given image class such as edges or stripes, and with the index q, the feature of the structure in the neighborhood of the pixel of interest could be judged in terms of figures. Note here that the image class may include, in addition to the edges or stripes, a texture portion. In the embodiment here, whether or not the feature of the structure in the neighborhood of the pixel of interest is an edge, a stripe or a texture portion could thus be specifically judged.

While keeping in parallel with such processing at the direction judgment block 121, two kinds of edge components for band enhancement are computed at the tone control block 122, band enhancement block A123 and band enhancement block B124. First, the tone control block 122 reads a G component pixel value in the neighborhood of 5×5 shown in FIG. 3($a$), as is the case with the direction judgment block 121, applying tone transform to each pixel value Gi (i is 1 to 12 or 13) by the tone transform table T to implement computation for the following formula Gi'=T(Gi) where i is 1 to 12 or 13 with the result of computation is sent out to the band enhancement blocks A123 and B124. The band enhancement blocks A123 and B124, in which the 5×5 linear filter coefficients F1 and F2 are loaded, apply them to the input form the tone control block 122 to compute edge components V1 and V2. FIG. 6 is illustrative of an example of the filter coefficients F1 and F2 and band characteristics. More specifically, FIG. 6($a$) is indicative of the contour plot of the frequency characteristics of the linear filter coefficient F1, and FIG. 6($b$) is indicative of the contour plot of the frequency characteristics of the linear filter coefficient F2, with horizontal frequencies (Nyquist=1) in the transverse direction and vertical frequencies in the longitudinal direction. Gain is also set in the direction coming out of the paper.

As can be seen from the frequency characteristics and coefficients of FIGS. 6($a$) and 6($b$), F1 and F2 have the following features: (1) each coefficient has point symmetry with respect to the center of the filter, (2) the frequency characteristics of F1 are symmetric with respect to both directions, horizontal and vertical, and they may have the same response to any arbitrary direction, and (3) the frequency characteristics of F2 have opposite signs in the horizontal and vertical directions. The filter coefficient has all diagonal components of 0. Thus, F1 and F2 are each configured in the form of a two-dimensional linear filter having a coefficient of point symmetry, and F2 is configured such that band correction characteristics in a particular direction take a negative value. With these features, F1 makes sure very high symmetry about the filter coefficient, and F2 often takes the coefficient value of 0. The number of multiplications and additions at the band enhancement blocks A123 and B124 is much less than that for a general edge enhancement filter, making sure diminished circuit size.

As the processing so far is over and there are the results V1, V2, p, q and r found from formulae (1) and (2), V1 and V2 are sent out to the weighting block 126, and p, q and r to the weighting determination block 125. At the weighting determination block 125, weights W1 and W2 for the weighted sum of V1 and V2 at the weighting block 126 are computed. A set of specific calculation formulae is given by the following (3).

$$W1=1-p+p*\{q*s1(r)+(1-q)*t1(r)\}$$

$$W2=p*\{q*s2(r)+(1-q)*t2(r)\} \quad (3)$$

In formulae (3), s1, and s2 is the weight optimum for the subject that is an edge or line, and t1, and t2 is the weight optimum for the subject that is a stripe form. Each weight is experimentally determined beforehand in such a way as to become optimum for the subject. FIG. 7 is illustrative of an example of s1 and s2, and t1 and t2. More specifically, FIG. 7($a$) is indicative of the weight characteristics for an edge, and FIG. 7($b$) is indicative of the weight characteristics for a stripe. A solid line and a broken line in FIG. 7($a$) are indicative of t1($r$) and t2($r$), respectively. Both the characteristics of FIGS. 7($a$) and 7($b$) have a weight value varying with an estimated value r about the direction of the structure in the neighborhood of the pixel of interest, and s2, and t2 in particular takes a larger negative value as r=0 or the edge in the neighborhood gets closer and closer to horizontal, and each takes a larger positive value as r=1 or the edge in the neighborhood gets closer and closer to vertical. As can be seen from the frequency characteristics of F1 and F2 shown in FIG. 6, consequently, there is the optimum edge enhancement feasible the way the closer the edge in the neighborhood of the pixel of interest gets to horizontal, the more the vertical frequency is enhanced, and the closer the edge in the neighborhood of the pixel of interest gets to vertical, the more the horizontal frequency is enhanced.

According to formulae (3), the more likely the subject is to be an edge, the closer W1, and W2 gets to s1, and s2, respectively, and the more likely the subject is to be a stripe, the closer W1, and W2 gets to t1, and t2, respectively. And the surer the judgment of whether the subject is a stripe or an edge, the closer the weight calculated gets to the weight for each subject.

The weighting coefficient determination block 125 of FIG. 2 sends the calculated weight out to the weighting block 126. The weighting block 126 receives V1 and V2 from the band enhancement blocks A123 and B124, weights W1 and W2 from the weighting coefficient determination block 125, and compute the final edge component E from formula (4), which is sent out to the Y/C synthesis block 110.

$$E=W1*V1+W2*V2 \quad (4)$$

In the first embodiment shown in FIGS. 1 and 2, the direction judgment block 121 in the edge enhancement block 106 acquires the noise characteristics of the imaging system from the noise table 105. For a modification to the first embodiment of the invention, it is acceptable to acquire the characteristics of the imaging system other than the noise characteristic information in the noise table 105, for instance, information about the type and position of a pixel deficiency or information about sensitivity differences between pixels at which the same kind of color information is obtained. The weighting block 126 determines the weight so that the more the quantity of noise, the more isotropic the band correction characteristics of weighed addition becomes, and send it out to the YC synthesis block 110. For a modification to the first embodiment according to the invention, it is contemplated that the weight is determined at the weighting block 126 the way the band correction characteristics of the results of weighted addition becomes smaller in the direction orthogonal to the direction along which there are successive pixel deficiencies.

The first embodiment corresponds to claims 1 to 11, and claims 14 to 21 as well. Referring here to how the first embodiment corresponds to the means of claim 1, the digital camera 100 of FIG. 1 is tantamount to the image processor for implementing correction of the spatial frequency band of an entered image; the edge enhancement means 106 is tantamount to a plurality of band correction means having mutually distinct band correction characteristics; the direction judgment block 121 of FIG. 2 is tantamount to the feature quantity computation means for computing a given feature quantity in the neighborhood of each pixel of the entered image; and the YC synthesis block 110 is tantamount to the synthesis means for synthesizing the outputs of said plurality of band correction means on the basis of said feature quantity. The limitation in claim 2 that "said synthesis means computes a weight for said each band correction means on the basis of said feature quantity, and produces the result of weighted addition by said weight from the result of band correction of said each band correction means" is tantamount to that the YC synthesis block 110 comprises the weighting block 126 of FIG. 2.

The limitation in claim 3 that "said feature quantity computation means computes the direction of an edge in said neighborhood as said given feature quantity" is tantamount to that the direction judgment block 121 of FIG. 2 computes the index r indicative of the directionality of the pixel of interest according to formulae (2). The limitation in claim 4 that "said feature quantity computation means computes the probability of said neighborhood belonging to a given image class as said given feature quantity" is tantamount to that the direction judgment block 121 of FIG. 2 computes the index q indicative of the type of the structure according to formulae (2). Further, the limitation in claim 5 that "said feature quantity computation means further computes the reliability of the result of computation in the direction of said edge as said given feature quantity" is tantamount to that the direction judgment block 121 of FIG. 2 computes the reliability p about the directionality of the structure according to formulae (2).

The limitation in claim 6 that "said given image class includes any of an edge portion, a stripe portion, and a texture portion" is tantamount to that the direction judgment block 121 of FIG. 2 corresponds to the pattern of FIGS. 4(b)-(4), 4(b)-(5), 4(b)-(6) and 4(b)-(7) depending on the value of the index q indicative of the type of the structure according to formulae (2). The limitation in claim 7 that "said feature quantity computation means computes said feature quantity on the basis of the characteristics of the imaging system when the said entered image is taken", and the limitation in claim 9 that "said characteristics of the imaging system are noise characteristics giving the relations of noise quantity vs. pixel value" is tantamount to that the characteristics of the noise table 105 of FIG. 2 are entered in the edge enhancement block 106. Further, the limitation in claim 8 that "said synthesis means implements synthesis on the basis the characteristics of the imaging system when said input image is taken" is tantamount to that the edge enhancement block 106 in which the characteristics of said noise table 105 are entered is connected to the YC synthesis block 110.

The limitation in claim 14 that "said feature quantity computation means lowers precision with which the direction of said edge is computed as said noise quantity grows large" is tantamount to that the index r in formulae (2) is divided by the noise quantity N, and the limitation in claim 15 that "said feature quantity computation means lowers the reliability of the direction of said edge as said noise quantity grows large" is tantamount to that the index p in formulae (2) is divided by the noise quantity N. Further, the limitation in claim 16 that "said synthesis means determines said weight such that the more said noise quantity, the more isotropic the band correction characteristics of said result of weighted addition grows" is tantamount to that the weight W1, and W2 is computed from formulae (3), viz., with the parameter of said p.

The limitation in claim 18 that "there are two such band correction means used, each being a two-dimensional linear filter having a coefficient of point symmetry" is tantamount to the linear filters F1 and F2 shown in FIGS. 5(a) and 5(b). The limitation in claim 19 that "one of said filters is such that the band correction characteristics in a particular direction have a negative value" is tantamount to the liner filter F2 shown in FIG. 5(b). The limitation in claim 20 that "said band correction means implements band correction after given tone transform is applied to said input images, and said feature quantity computation means computes said feature quantity without implementing said given tone transform" is tantamount to that one of the outputs of the image buffer 104 of FIG. 2 is entered in the band enhancement blocks A and B through the tone control block 122, and the other is entered in the direction judgment block 121.

While the embodiments of the invention here have been described, it is contemplated that similar processing may be implemented even on software, let alone on hardware such as digital cameras. As that example, there is a flowchart of RAW development software shown. This software runs with RAW image data as input, said data corresponding to an image recorded in the image buffer 104 in FIG. 1, producing a color image by implementing on software processing that is usually implemented within a digital camera.

Referring more specifically to the flowchart of FIG. 8, at step S1 the RAW image data is read. At step S2, an edge image is formed that includes an edge component of each pixel extracted from the RAW image data, and stored in the memory. Then at step S3, one pixel of interest is chosen the RAW image data, and color interpolation processing is applied to that pixel of interest to compensate for a component missing from it. At step S5, the RGB components of the pixel of interest are color transformed on a color transform matrix into a luminance component and a color difference component. At step S6, the gain of the color difference component is controlled to enhance color saturation. Then at step S7, first, the value corresponding to the pixel of interest in the edge image, figured out at step S2, is added to the luminance component. Then at step S6, it is synthesized with the color difference component with its color saturation enhanced at step S6, again back to the RGB value. Thus, the processing for the pixel of interest is over, and the final result is stored in the memory. Finally, at step S8 whether or not unprocessed pixels remain is judged. If not, the final result of each pixel held in the memory is stored, and if so, the steps S3-8 are resumed on.

For the step S2 here for the generation of the edge image, a further detailed sub-routine is shown in the form of a flow-chart in FIG. 9.

In that flowchart, one of the pixels of interest in the RAW image data is read out at step S10, and then at step S11 the neighborhood of the pixel of interest is read out. At step S12, the noise quantity N is figured out based on the ISO sensitivity information at the taking time and information abut the type of the digital camera out of which the RAW data have been produced, as is the case with the direction judgment block 121. At step S13, the values of p, q and r are figured out from the neighboring pixel values as is the case with the direction judgment block 121, and at step S14, the edge components V1 and V2 are figured out as is the case with the band enhancement blocks A123 and B124. At step S15, W1 and W2 are figured out from p, q and r as is the case with the weighting coefficient determination block 125, and at step S16, the final edge component of the pixel of interest is figured out as is the case with the weighting block 126 to hold it in the memory as the pixel value of the edge image at the pixel of interest. And at step S17, whether or not the processing for all the pixels are over is judged, and if there are unprocessed pixels, the steps S10-17 are resumed on.

In the flowchart of FIGS. 8 and 9 about the image processing program of claim 21 for correcting the image data for spatial frequency bands, the step of reading the image data is tantamount to step S for reading the RAW data; the step of implementing a plurality of band corrections having mutually distinct band correction characteristics is tantamount to the step S14 of figuring out the edge component; the step of figuring out a given feature quantity in the neighborhood of each pixel of said image data is tantamount to the steps S12 and S13 in FIG. 9; and the step of synthesizing the outputs from said multiple band corrections on the basis of said feature quantity is tantamount to the steps S15 and S16.

Figure 10:
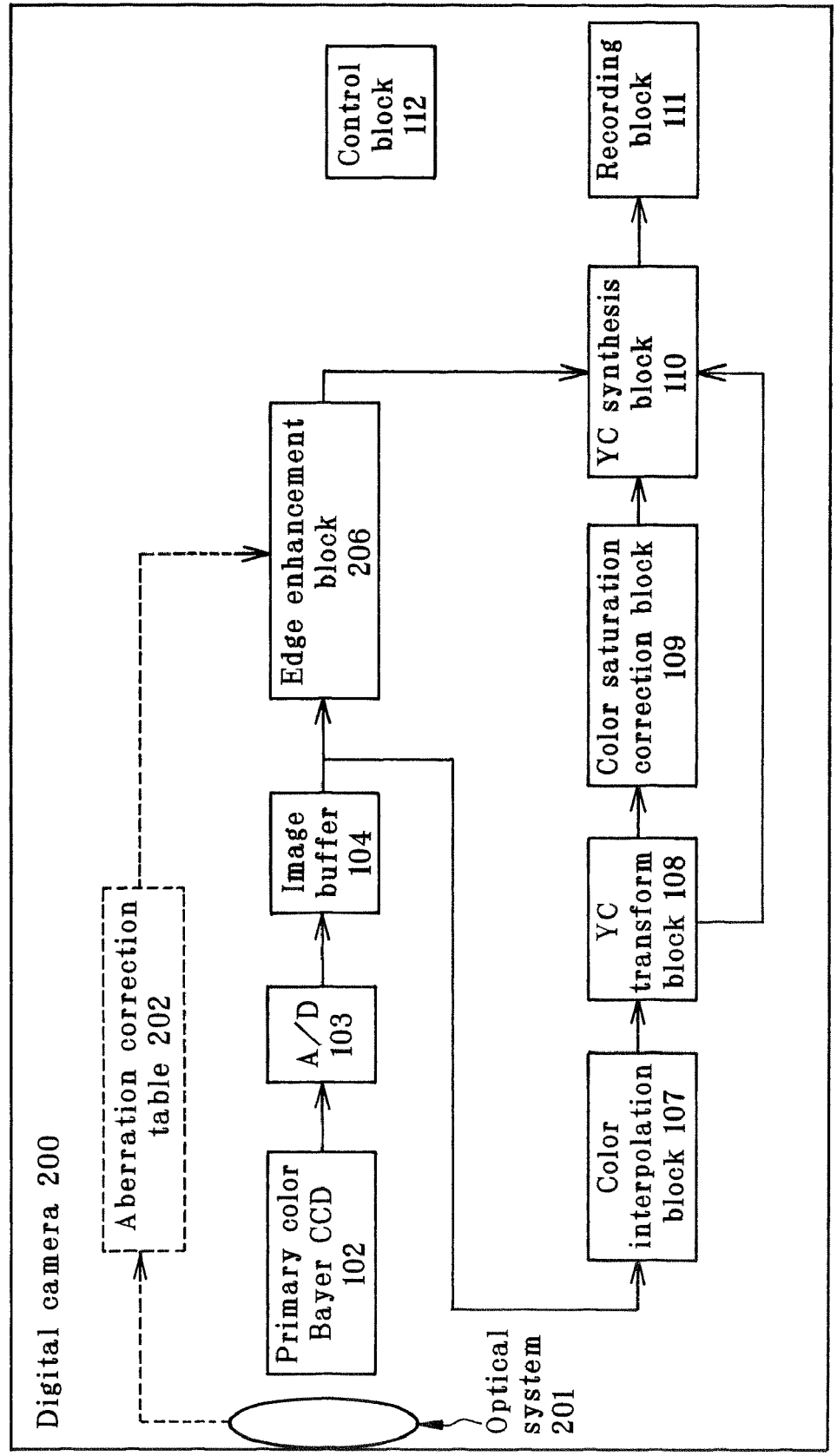
FIG. 10 is illustrative of the architecture of the second embodiment.
Figure 11:
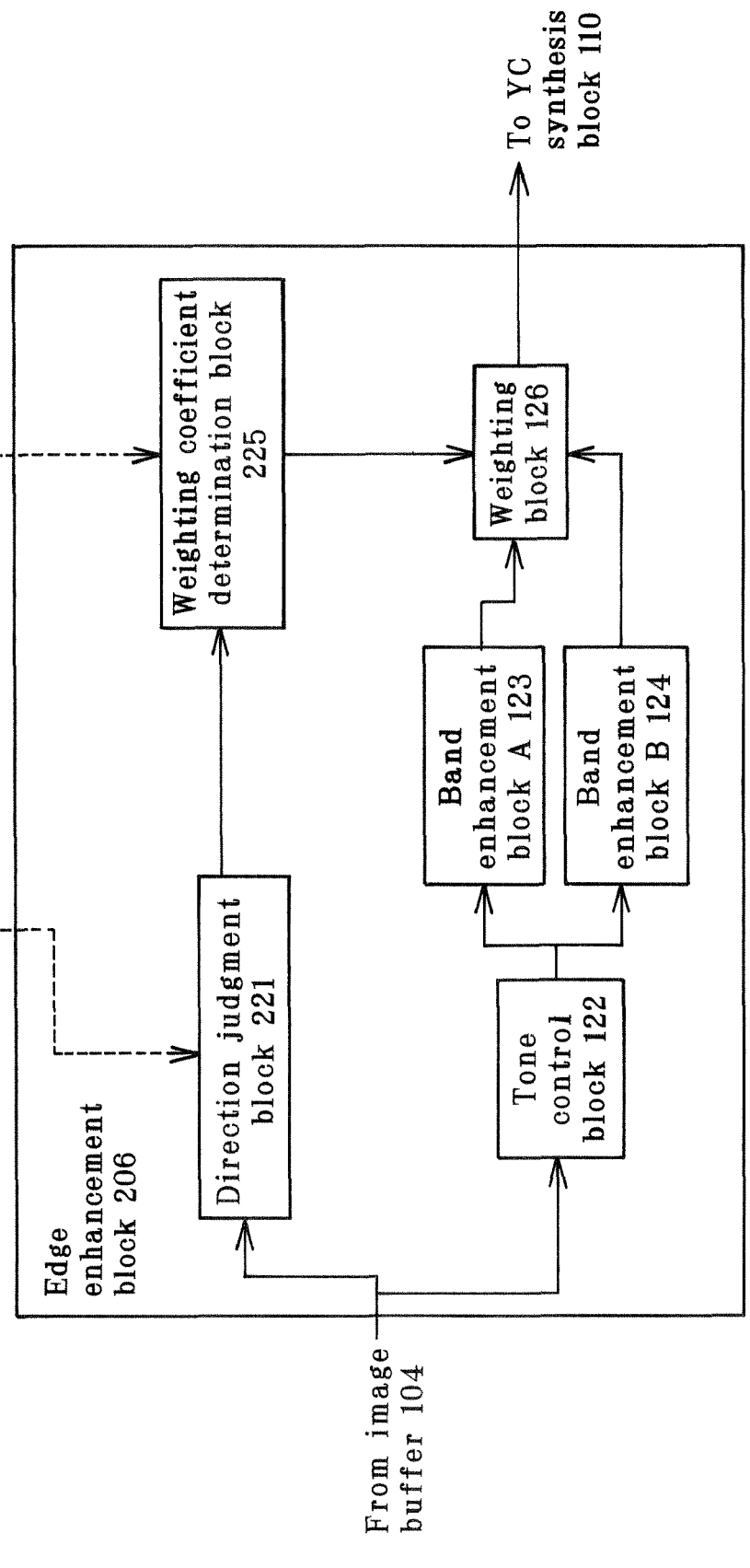
FIG. 11 is illustrative of the setup of the edge enhancement block in FIG. 10.
Figure 12:
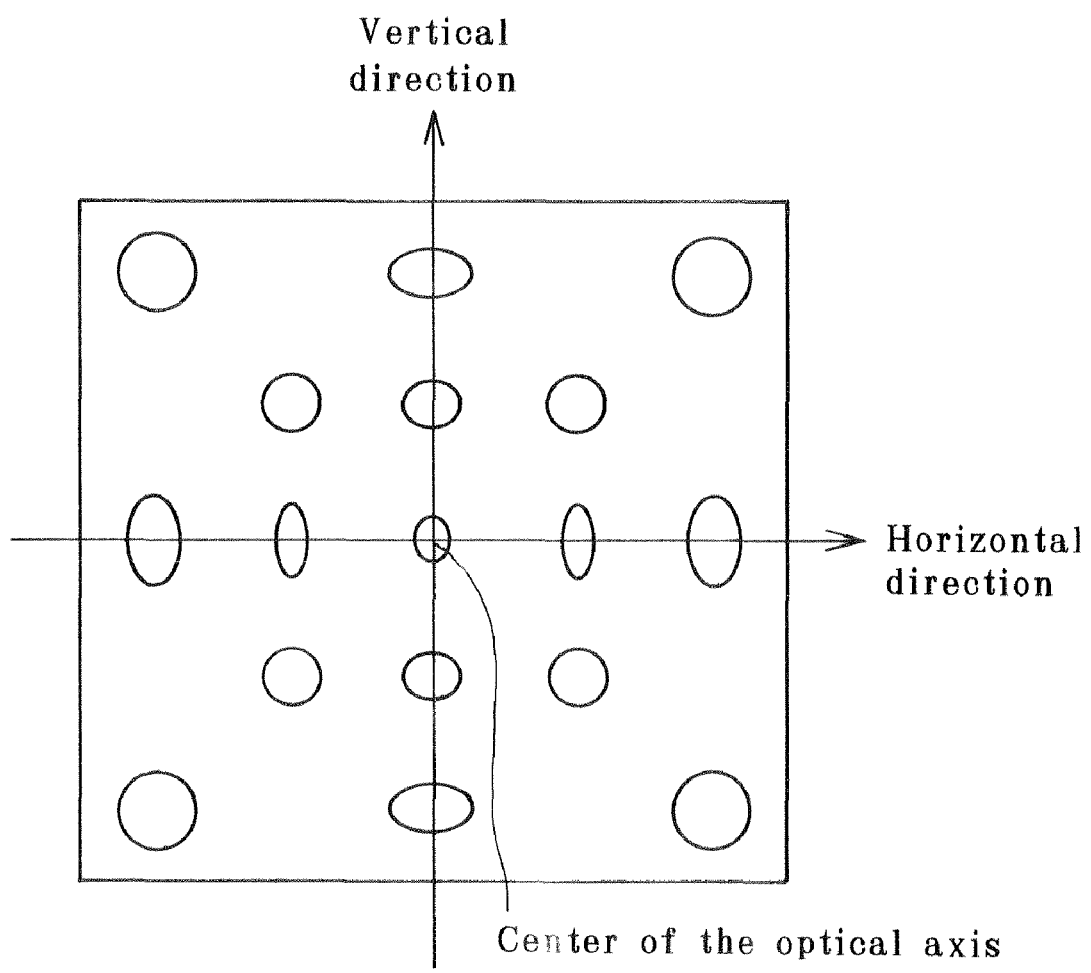
FIG. 12 is illustrative of the aberrations of the optical system.
Figure 13A:
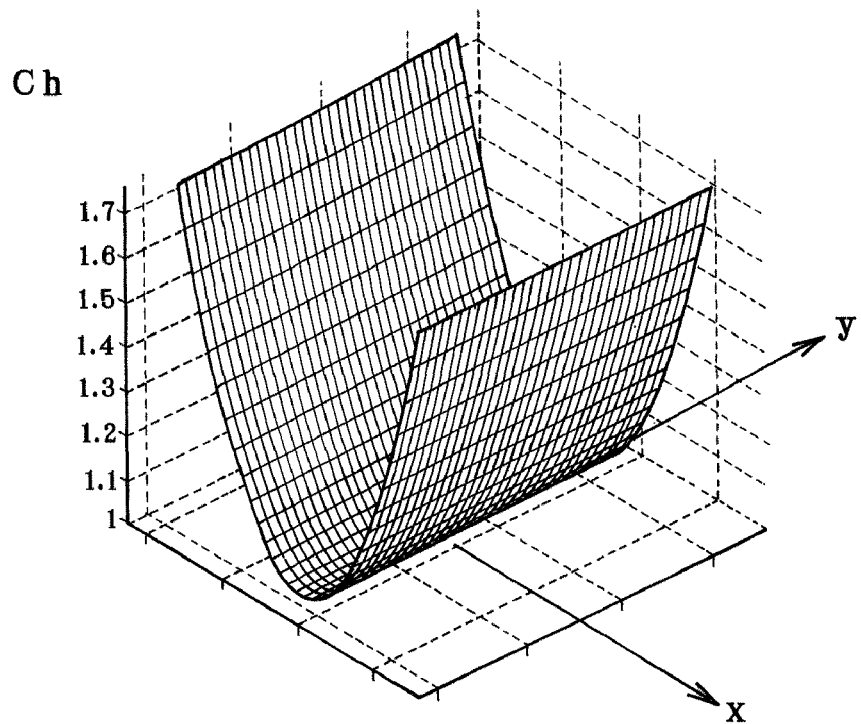
FIG. 13 is illustrative of the coefficient for compensating for MTF deterioration due to aberrations.
Figure 13B:
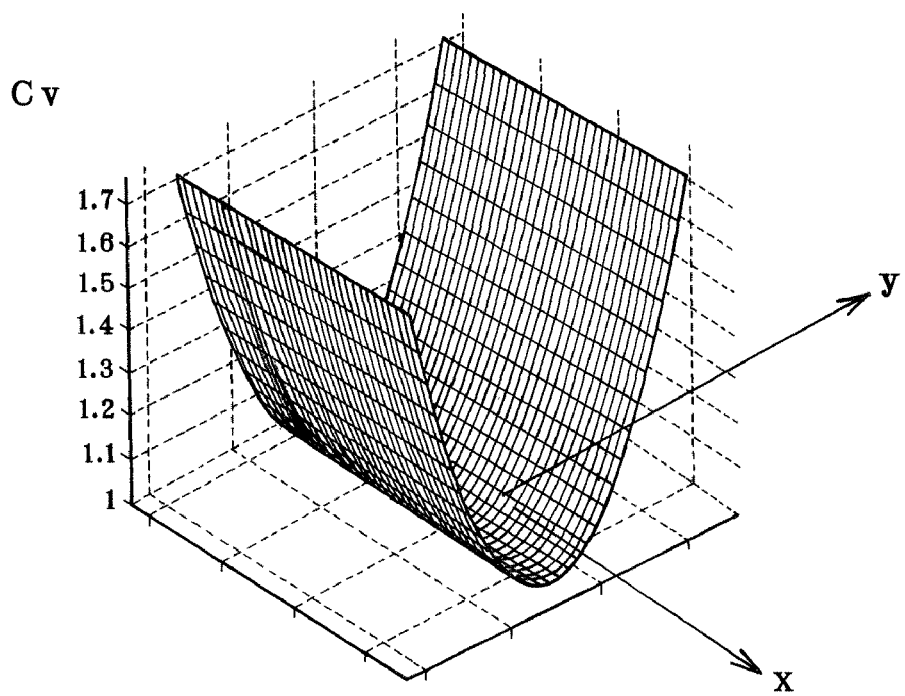
Figure 14A:
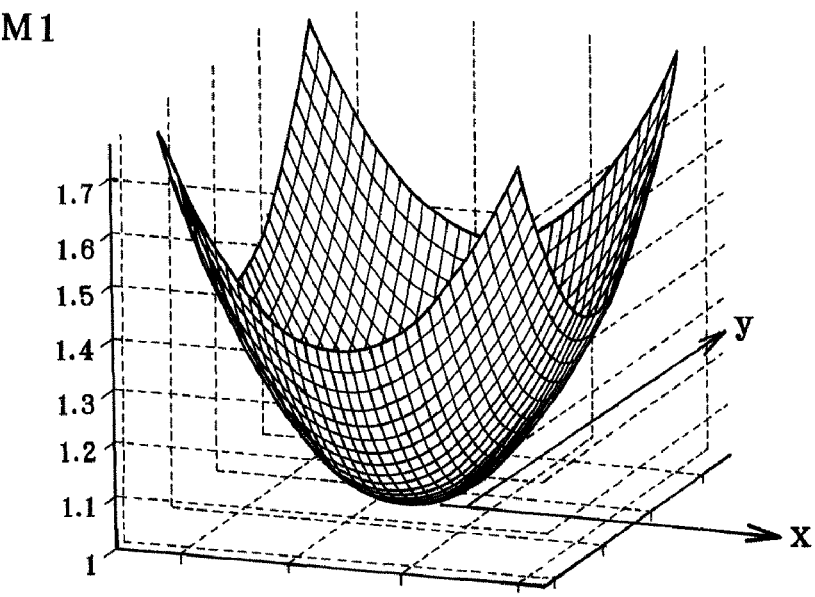
FIG. 14 is illustrative of the coefficient for compensating for MTF deterioration due to aberrations.
Figure 14B:
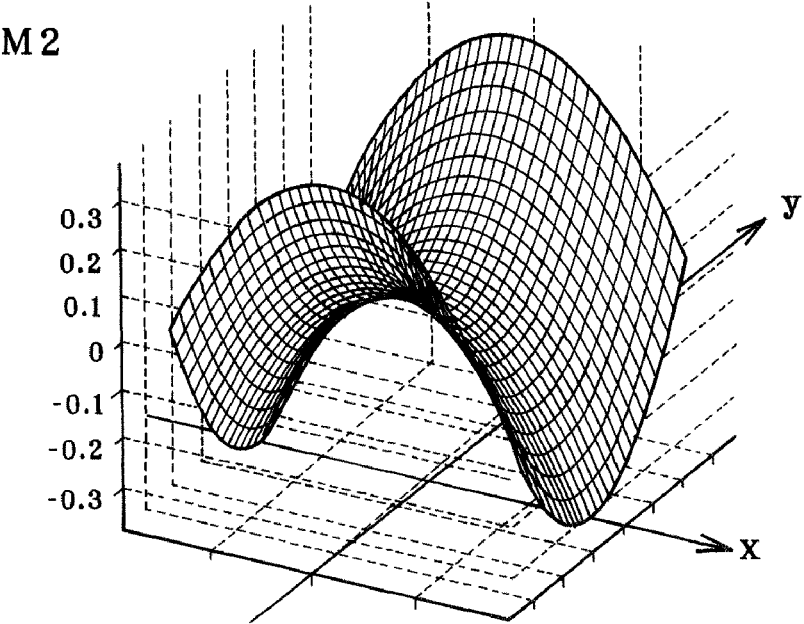
Figure 15:
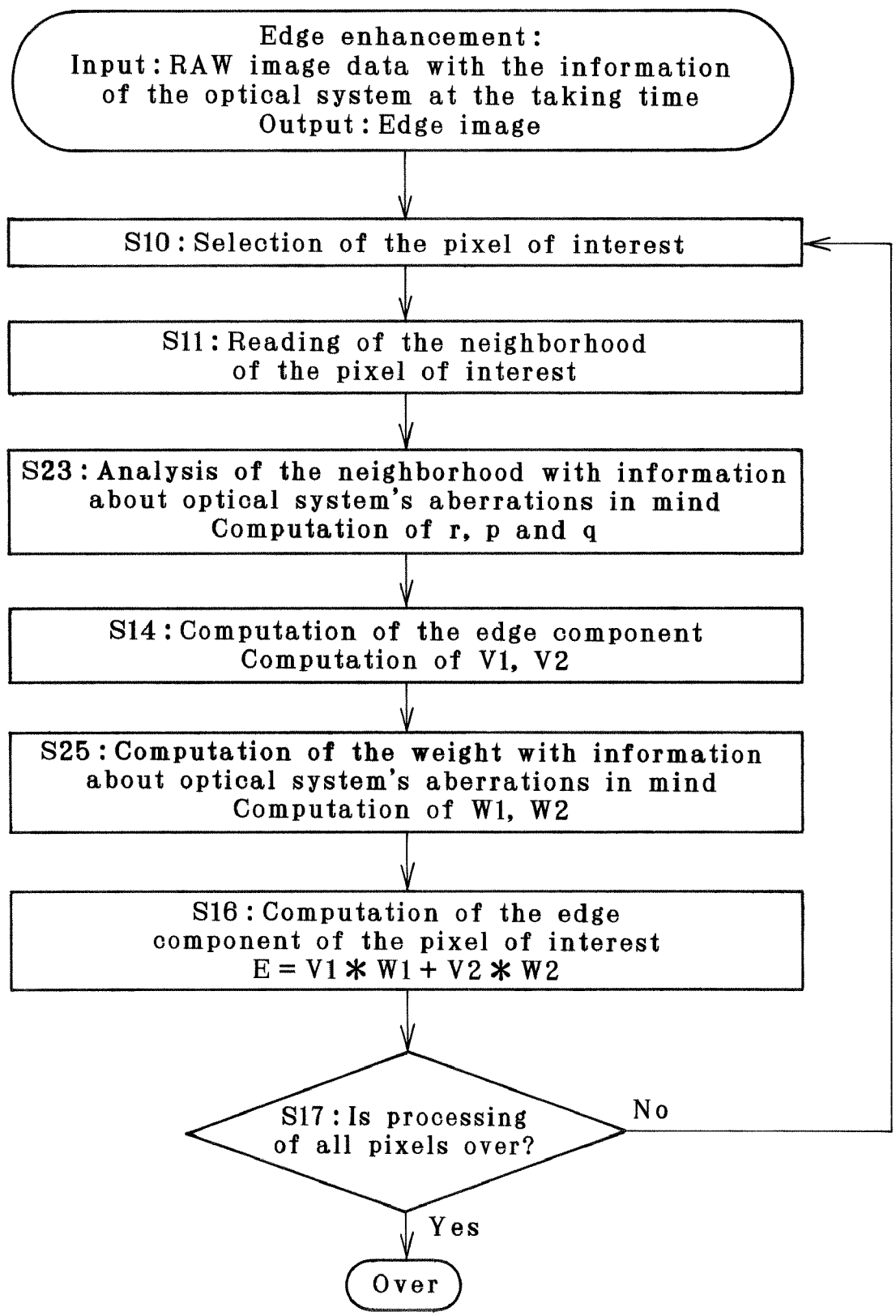
FIG. 15 is a flowchart of how to figure out an edge component in the second embodiment.

FIGS. 10 to 15 are illustrative of the second embodiment. FIG. 10 is illustrative of the architecture of the second embodiment; FIG. 11 is illustrative of the setup of an edge enhancement block 206; FIG. 12 is indicative of aberrations of an optical system 201; FIGS. 13 and 14 are illustrative of coefficients for compensating for MTF deterioration caused by aberrations; and FIG. 15 is a flowchart of the computation of an edge component in the second embodiment.

The second embodiment shown in FIG. 10, again applied to a digital camera, overlaps the first embodiment. In what follows, like components having the same action are indicated by like numerals in the first embodiment, and so will not be explained anymore.

In the second embodiment shown in FIG. 10, a digital camera 200 has none of the noise table 105 in the first embodiment, and instead includes an aberration correction table 202. The optical system 201 is of a special type with aberration characteristics about its MTF deterioration being a superposition of horizontal and vertical deteriorations, not axially symmetric, as shown in FIG. 12. Ovals in FIG. 12 are indicative of the degree and shape of optical blurs of point sources. Such characteristics are experienced in an optical system comprising, for instance, cylindrical lenses and special prisms. Further, the edge enhancement block 206 acts differently with the edge enhancement block 106. The aberration correction table 202 is connected to the optical system 201 and edge enhancement block 206.

FIG. 11 is illustrative of details of the setup of the edge enhancement block 206 shown in FIG. 10. This block 206 is different from the edge enhancement block 106 in the first embodiment shown in FIG. 2 in that a direction judgment block 221 and a weighting coefficient determination block 225 operate differently. And the aberration correction table 202 is connected to the direction judgment block 221 and weighting coefficient determination block 225. Connections between the direction judgment block 221, tone control block 122, band enhancement block A123, band enhancement block B124, weighting coefficient determination block 225 and weighting block 126 are the same as in the first embodiment of FIG. 2.

How the second embodiment operates is now explained. As the shutter (not show) is pressed down, the second embodiment operates the same way as does the first embodiment, except the edge enhancement block 206 that, too, operates the same way as in the first embodiment, except the direction judgment block 221 and weighting coefficient determination block 225. Therefore, only the operation of the direction judgment block 221 and weighting coefficient determination block 225 is now explained. At the direction judgment block 221, the direction and structure of an edge in the neighborhood of the pixel of interest are estimated using information on the aberration correction table 202, unlike the first embodiment. There are correction coefficients Ch and Cv stored in the aberration correction table, which are indicative of to what degree horizontal and vertical band corrections must be implemented so as to make compensation for MTF deterioration depending on the state of the optical system 201 at the taking time. The data is a function about the coordinates (x, y) for the pixel of interest, one example of which is shown in FIGS. 13(a) and 13(b).

In the embodiment here where the setup of the optical system 201 is unique, Ch that is the coefficient for making compensation for horizontal deterioration is a function with respect to x alone, and Cv that is the coefficient for making compensation for vertical deterioration is a function with respect to y alone. As shown in FIG. 13(a), the coefficient Ch takes a minimum value of 1 at the bottom of FIG. 13(a) and an increasing value at the top. Thus, the correction coefficients Ch and Cv are the functions with respect to x and y alone, respectively, having the advantage of reducing the quantity of data on the aberration correction table. At the direction judgment block 221, these correction coefficients Ch and Cv are read out of the aberration correction table to implement computation using the following set of formulae (5) in place of formulae (2) in the first embodiment.

$$qh = \{\min((dh1,dh2,dh3)+Nc\}/\{\max(dh1,dh2,dh3)+Nc\}$$

$$qv = \{\min((dv1,dv2,dv3)+Nc\}/\{\max(dv1,dv2,dv3)+Nc\}$$

$$dh' = Ch(x)*dh, dvi' = Cv(y)*dv$$

$$r = (dv'-dh)/\{2*(dh'+dv')+\alpha*Nc\}+0.5$$

$$p = \text{clip}\{\max(dh',dv')/(\beta*Nc),1\}$$

If $q = dh' > dv'$, $qh$, and if not, $qv$. (5)

where min(x, y, z) are the minimum values of x, y and z; max(x, y, z) are the maximum values of x, y and z; and clip (x, a) is the function for limiting x to less than a.

α and β in the set of formulae (5) are again the constants as in the first embodiment, and Nc is a constant, which corresponds to the noise quantity N found using the noise table 105 in the first embodiment. With the instant embodiment wherein the feature quantities p, q and r are figured out, it is possible to make estimation of direction and structure with correction of the influence of MTF deterioration caused by aberrations. At the weighting coefficient determination block 225, constants M1(x, y) and M2(x, y) indicative of to what degree the weight used at the weighting block 126 must be corrected so as to make compensation for MTF deterioration depending on the state of the optical system 201 at the taking time are read out of the aberration correction table 202 for computation, where (x, y) is the coordinates for the pixel of interest. FIGS. 14(*a*) and 14(*b*) are illustrative of one example of the constant M1(*x, y*), and M2(*x, y*), respectively. As can be seen from FIG. 14(*a*), the constant M1(*x, y*) has symmetry about the center of the optical axis in the horizontal and vertical directions, and as can be seen from FIG. 14(*b*), the constant M2(*x*, y) has opposite signs about the center of the optical axis in the horizontal and vertical directions. And at the weighting coefficient determination block 225, the weighting coefficient figured out from the set of formulae (3) is further corrected according to the following set of formulae (6) to send W1' and W2' out to the weighting block 126.

$$W1'=W1*M1+W2*M2$$

$$W2'=W1*M2+W2*M1 \quad (6)$$

By computation according to the set of formulae (6), it is possible to determine the weight in such a way as to allow the final edge enhancement characteristics to make compensation for the MTF deterioration caused by aberrations, and be the best suited for the direction and structure of the edge in the neighborhood of the pixel of interest as well.

As is the case with the first embodiment, it is claims 1 to 8, 14 to 16 and 18 to 20 that correspond to the second embodiment.

The "band characteristics of the optical system" in claim 12 is tantamount to those of the optical system 201 stored in the aberration correction table 202.

While the embodiment here is described as applied to a digital camera, it is contemplated that similar processing may run on software, too. More specifically, in the flowchart of the RAW development software in the first embodiment shown in FIG. 8, the edge computation step S2 is changed. FIG. 15 is a flowchart of the second embodiment. In this flowchart, the subroutine flowchart for the edge component computation in the first embodiment shown in FIG. 9 is partly removed and corrected. Like numerals in FIG. 9 are intended to indicate like steps, and different numerals are intended to indicate corrected steps. Only the corrected steps are now explained. At step 23, the step 13 of FIG. 9 is implemented with the changing of the set of formulae (2) to the set of formulae (5), and the correction coefficients Ch and Cv needed here are supposed to be recorded in the header of the RAW data. At step 25, the step 15 of FIG. 9 is implemented with the changing of the set of formulae (3) to the set of formulae (6), and the correction coefficients M1 and M2 needed here are again supposed to be recorded in the head of the RAW data. The flowchart relating to the second embodiment shown in FIG. 15 corresponds to the image processing program recited in claim 21.

Figure 16:
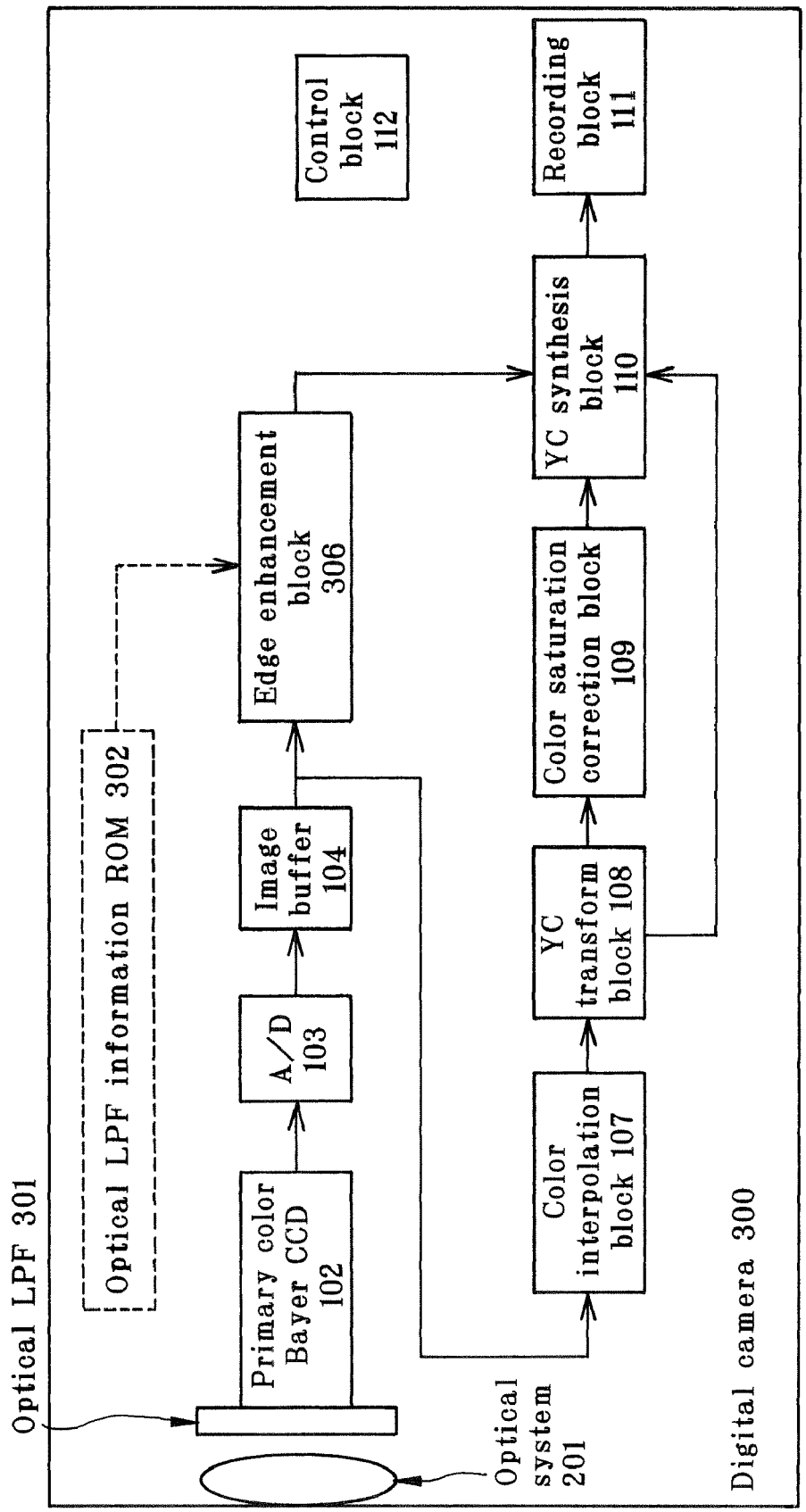
FIG. 16 is illustrative of the architecture of the third embodiment.
Figure 17:
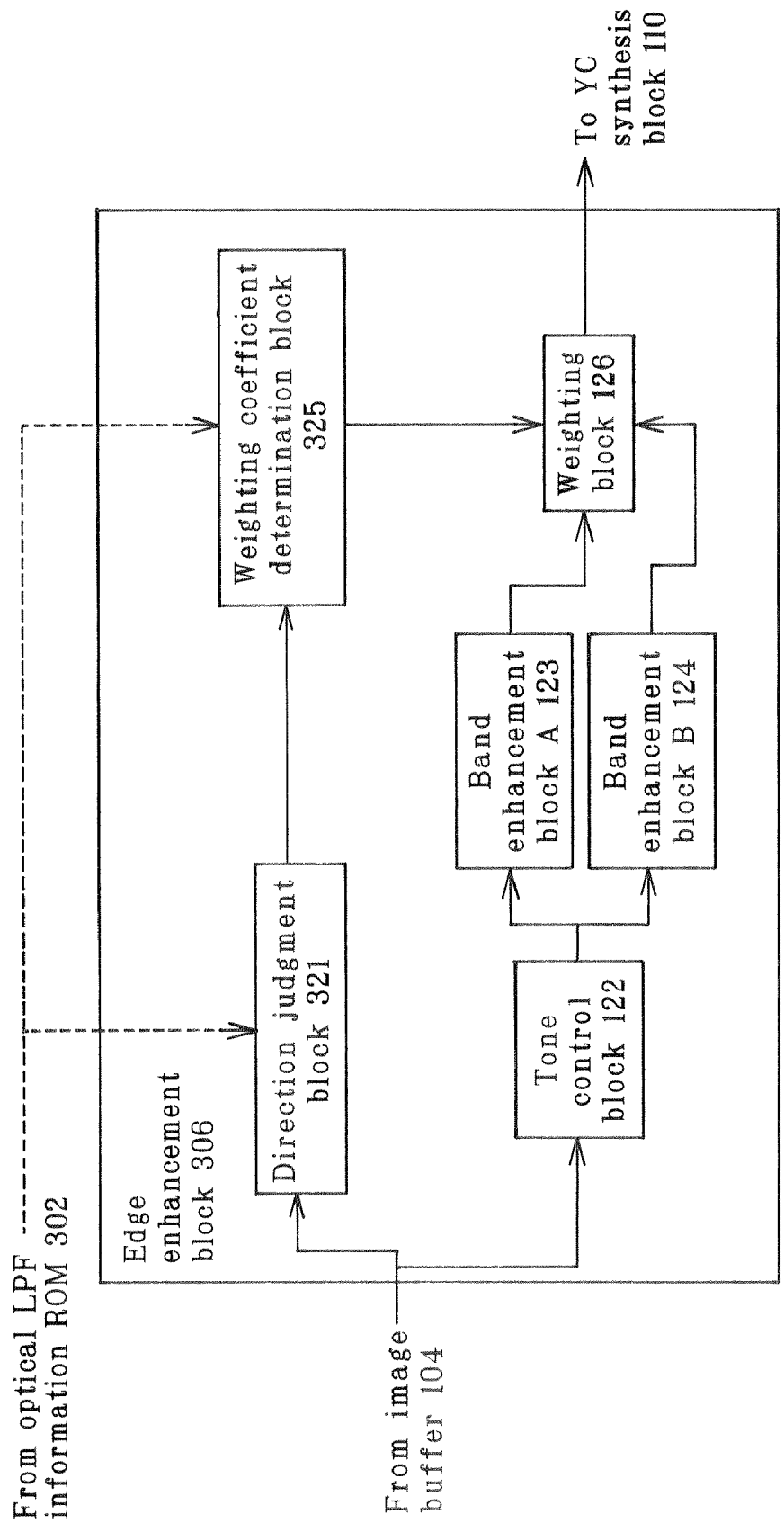
FIG. 17 is illustrative of the setup of the edge enhancement block in FIG. 16.
Figure 19:
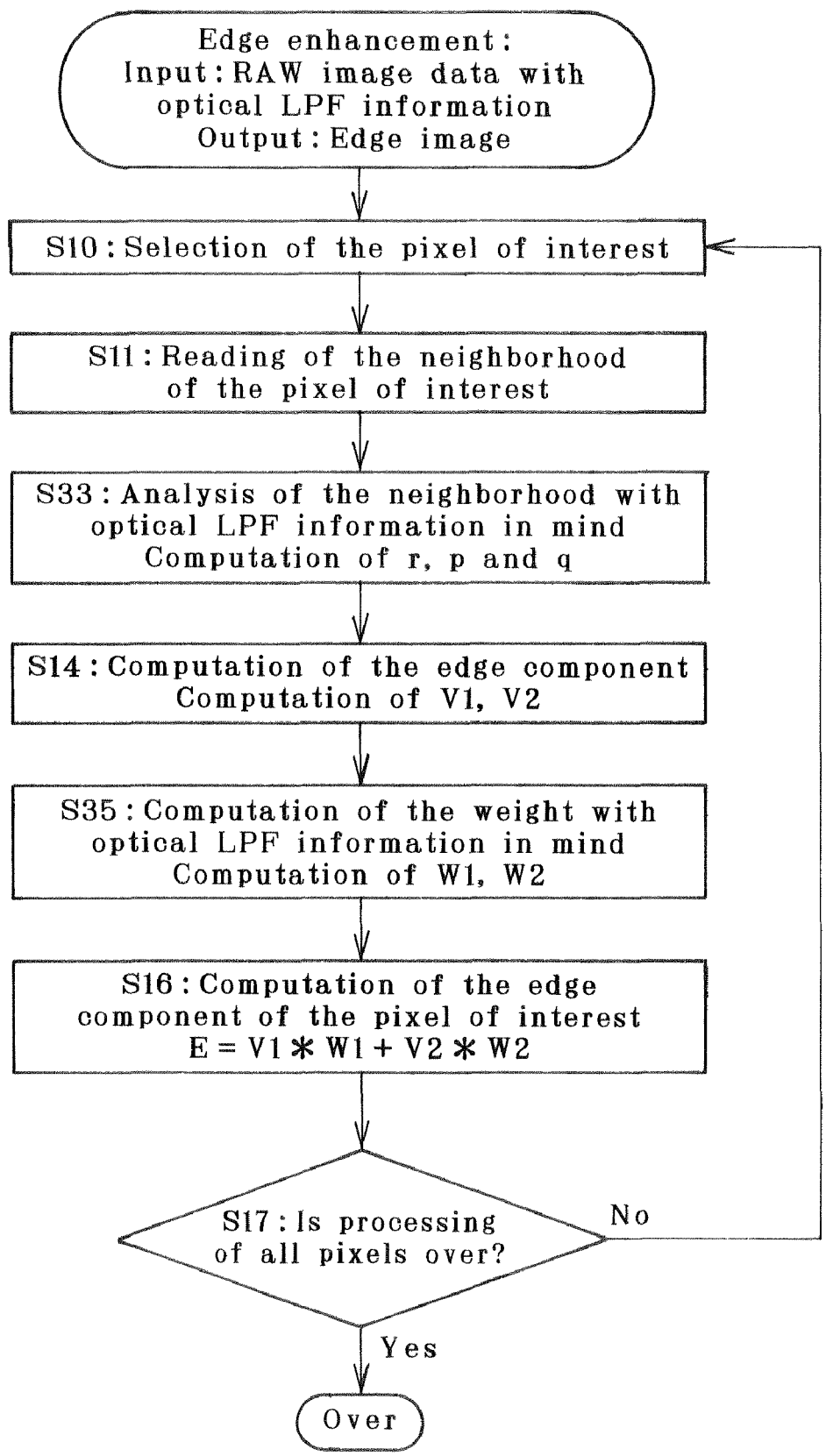
FIG. 19 is a flowchart of how to figure out an edge component in the third embodiment.

FIGS. 16 to 19 are illustrative of the third embodiment of the invention; FIG. 16 is illustrative of the architecture of the third embodiment, FIG. 17 is illustrative of the setup of the edge enhancement block in FIG. 16, FIG. 18 is illustrative of a correction coefficient table adapting to the type of the optical LPF, and FIG. 19 is a flowchart for how to figure out the edge component in the third embodiment. The instant embodiment shown in FIG. 16 is applied to a digital camera, too. The third embodiment overlaps the first embodiment; the component having the same action is given the same numeral as in the first embodiment, and will no more be explained.

In the third embodiment shown in FIG. 16, a digital camera 300 is provided with an optical LPF in front of the primary color Bayer CCD 102, and an optical LPF information ROM 302 is used in place of the noise table 105 in the first embodiment. Further, since an edge enhancement block is indicated by reference numeral 306 because of acting differently from the edge enhancement block 106 in the first embodiment. The optical LPF information ROM 302 is connected to the edge enhancement block 306. FIG. 17 is illustrative of details of the setup of that edge enhancement block 306 comprising a direction judgment block 321 and a weighting coefficient determination block 325 the operation of which is distinct from that in the edge enhancement block 106 in the first embodiment. And the optical LPF information ROM 302 is connected to both.

There are correction coefficients stored in the optical LPF information ROM 302 to make compensation for horizontal and vertical deteriorations caused by the optical LPF 301. The optical LPF has distinct band deterioration characteristics in the horizontal and vertical directions, as can be seen from the frequency characteristic types 1, 2 and 3 of FIGS. 18(*a*), 18(*b*) and 18(*c*), although varying with its setup. FIGS. 18(*a*), 18(*b*) and 18(*c*) are the contour plot of the frequency response of optical LPT in which horizontal frequencies (Nyquist=1) are shown in the transverse direction and vertical frequencies (Nyquist=1) in the longitudinal direction. Gain is also set in the direction coming out of the paper. Thus, because the optical LPF has distinct band deterioration characteristics in the horizontal and vertical directions, it is necessary to control, depending on the type of the optical LPF, the judgment of the direction of edges and processing for telling edges from stripes at the edge enhancement block as well as edge enhancement characteristics. To this end, the optical LPF information ROM 302 takes hold of such a coefficient table as depicted in FIG. 18(*d*), depending on the type of the optical LPF mounted in the digital camera. FIG. 18(*d*) is indicative of the relations of optical LPF types 1, 2 and 3 vs. coefficients. There are six coefficients C1 to C6 involved, with C1 and C2 used at a direction judgment block 321 and C3 to C6 used at a weighting coefficient determination block 325.

How the third embodiment operates is now explained. As the shutter (not show) is pressed down, the third embodiment operates the same way as does the first embodiment, except the edge enhancement block 306 that, too, operates the same way as in the first embodiment, except the direction judgment block 321 and weighting coefficient determination block 325. Therefore, only the operation of the direction judgment block 321 and weighting coefficient determination block 325 is now explained. At the direction judgment block 321, the direction and structure of an edge in the neighborhood of the pixel of interest are estimated using information on the optical LPF information ROM 302, unlike the first embodiment. At the direction judgment block 321, the correction coefficients C1 and C2 about the type corresponding to the optical LPF 301 are read out of the optical LPF information ROM to implement calculation using the following set of formulae (7) instead of the set of formulae (2).

$$qh=\{\min((dh1,dh2,dh3)+Nc\}/\{\max(dh1,dh2,dh3)+Nc\}$$

$$qv=\{\min((dv1,dv2,dv3)+Nc\}/\{\max(dv1,dv2,dv3)+Nc\}$$

$$dh'=C1*dh, dv'=C2*dv$$

$$r=(dv1-dh1)/\{2*(dh1+dv1)+(*Nc\}+0.5$$

$$p=\text{clip}\{\max(dh',dv')/(\beta*Nc),1\}$$

$$\text{If } q=dh'>dv', qh, \text{ and if not}, qv. \quad (5)$$

where min(x, y, z) are the minimum values of x, y and z; max(x, y, z) are the maximum values of x, y and z; and clip (x, a) is the function for limiting x to less than a.

α and β in the set of formulae (7) are again the constants as in the first embodiment, and Nc is a constant, which corresponds to the quantity of noise N found using the noise table 105 in the first embodiment. With the instant embodiment wherein the feature quantities p, q and r are figured out, it is possible to make estimation of direction and structure with correction of the influence of MTF deterioration caused by the optical LPF 301. At the weighting coefficient determination block 325, the correction coefficients C3 to C6 for the type corresponding to the optical LPF 301 are again read out of the optical LPF information ROM 302, and constants C1' and C2' indicative of to what degree the weight used at the weighting block 126 must be corrected so as to make compensation for MTF deterioration depending on the optical LPF 301 are figured out according to the following set of formulae (8).

$$C1'=q*C3+(1-q)*C5$$

$$C2'=q*C4+(1-q)*C6 \quad (8)$$

In the set of formulae (8), C3 and C4 are the appropriate coefficients for horizontal and vertical band deteriorations when there is an edge in the neighborhood of the pixel of interest, and C5 and C6 are the appropriate correction coefficients for horizontal and vertical band deteriorations when there is a stripe in the neighborhood of the pixel of interest. And at the weighting coefficient determination block 325, the weighting coefficient figured out according to the set of formulae (3) is further corrected according to the following set of formulae (9) to send W1' and W2' out to the weighting block 126.

$$W1'=W1*C1'+W2*C2'$$

$$W2'=W1*C2'+W2*C1 \quad (9)$$

By computation according to the set of formulae (9), it is possible to determine the weight in such a way as to allow the final edge enhancement characteristics to make compensation for the MTF deterioration caused by the optical LPF 301, and be the best suited for the direction and structure of the edge in the neighborhood of the pixel of interest as well.

While the embodiment here is described as applied to a digital camera, it is contemplated that similar processing may run on software, too. More specifically, in the flowchart of the RAW development software in the first embodiment shown in FIG. 9, the edge computation step S2 is changed. FIG. 19 is a flowchart of the embodiment here. In this flowchart, the flowchart for the edge component computation in the first embodiment shown in FIG. 9 is partly removed and corrected. Like numerals in FIG. 9 are intended to indicate like steps, and different numerals are intended to indicate corrected steps. Only the corrected steps are now explained. At step 33, the step 13 of FIG. 9 is implemented with the changing of the set of formulae (2) to the set of formulae (7), and the correction coefficients C1 and C2 needed here—for the type of the optical LPF used for taking the RAW data—are recorded in the header of the RAW data. At step 35, the step 15 of FIG. 9 is implemented with the changing of the set of formulae (3) to the sets of formulae (8) and (9), and the correction coefficients C3 to C6 needed here are again supposed to be recorded in the head of the RAW data. The flowcharts relating to the first embodiment of FIG. 1, the second embodiment of FIG. 15 and the third embodiment of FIG. 19 correspond to the image processing program recited in claim 21.

INDUSTRIAL APPLICABILITY

According to the invention as described above, it is possible to provide an image processor and image processing program which, with ISO sensitivity and the state of the optical system in mind, applies the optimum band correction to a subject.

What I claim is:

1. An image processor for correcting a spatial frequency band of an input image, the image processor comprising:
   a plurality of band correction sections having mutually distinct band correction characteristics;
   a feature quantity computation section adapted to determine a feature quantity in a neighborhood of each pixel of the input image, wherein said feature quantity includes a direction of an edge in said neighborhood; and
   a synthesis section adapted to synthesize outputs of said plurality of band correction sections based on said feature quantity,
   wherein said synthesis section is configured to determine a weight for each of said plurality of band correction sections based on said feature quantity, and produce a result of weighting by adding said weight to a result of band correction by each of said band correction sections.

2. The image processor according to claim 1, wherein said feature quantity computation section is configured to determine a probability of said neighborhood belonging to a given image class as said given feature quantity.

3. The image processor according to claim 1, wherein said feature quantity computation section is further configured to determine a reliability of a result of computation of the direction of said edge as said given feature quantity.

4. The image processor according to claim 2, wherein said given image class includes any one of an edge portion, a stripe portion, and a texture portion.

5. The image processor according to claim 1, wherein said feature quantity computation section is configured to determine said feature quantity based on characteristics of an imaging system when said input image is taken.

6. The image processor according to claim 1, wherein said synthesis section is configured to implement synthesis based on characteristics of an imaging system when said input image is taken.

7. The image processor according to claim 5, wherein said characteristics of the imaging system are noise characteristics that provide a relation of noise quantity with respect to pixel value.

8. The image processor according to claim 5, wherein said characteristics of the imaging system are information about a type and position of a pixel deficiency.

9. The image processor according to claim 5, wherein said characteristics of the imaging system are a sensitivity difference between pixels at which a same type color information is obtained.

10. The image processor according to claim 5, wherein characteristics of the imaging system are a spatial frequency characteristics of an optical system.

11. The image processor according to claim 10, wherein said characteristics of the imaging system are the spatial frequency characteristics of an optical low pass filter (LPF).

12. The image processor according to claim 7 wherein said feature quantity computation section is configured to lower a precision with which said direction of the edge is determined as said noise quantity grows large.

13. The image processor according to claim 7, wherein said feature quantity computation section is configured to lower a reliability of said direction of the edge as said noise quantity grows large.

14. The image processor according to claim 1, wherein said synthesis section is configured to determine said weight such that the more noise quantity, the more likely the band correction characteristics of said weighted addition is to grow isotropic.

15. The image processor according to claim 1, wherein said synthesis section is configured to determine said weight such that the band correction characteristics of said result of weighed addition become small in a direction orthogonal to a direction along which there are successive pixel deficiencies.

16. The image processor according to claim 1, wherein there are two band correction sections each of which is a two-dimensional linear filter having a coefficient of point symmetry.

17. The image processor according to claim 16, wherein one of two two-dimensional linear filters is configured such that the band correction characteristics in a particular direction have a negative value.

18. The image processor according to claim 1, wherein said plurality of band correction sections are configured to apply given tone transform to said input image, and then implement band correction, and said feature quantity computation section determines said feature quantity with none of said given tone transform.

19. A non-transitory computer readable medium storing instructions, which when executed by a computer, cause the computer to execute a method to correct image data for a spatial frequency band, the method including:
   reading image data;
   implementing a plurality of band corrections having mutually distinct band correction characteristics;
   determining a given feature quantity in a neighborhood of each pixel of said image data, wherein said given feature quantity includes a direction of an edge in said neighborhood; and
   synthesizing outputs of said plurality of band corrections based on said given feature quantity, wherein synthesizing the outputs includes determining a weight for each of said plurality of band corrections based on said feature quantity, and producing a result of weighting by adding said weight to a result of band corrections.

20. The image processor according to claim 6, wherein said characteristics of the imaging system are information about a type and position of a pixel deficiency.

21. The image processor according to claim 6, wherein said characteristics of the imaging system are sensitivity difference between pixels at which a same type color information is obtained.

* * * * *